(12) United States Patent
O'Brien

(10) Patent No.: US 10,318,756 B2
(45) Date of Patent: Jun. 11, 2019

(54) METHODS AND SYSTEMS FOR SECURE DOCUMENT MANAGEMENT

(71) Applicant: Laura Ruth O'Brien, Alamo, CA (US)

(72) Inventor: Laura Ruth O'Brien, Alamo, CA (US)

(*) Notice: Subject to any disclaimer, the term of this patent is extended or adjusted under 35 U.S.C. 154(b) by 0 days.

(21) Appl. No.: 15/293,254

(22) Filed: Oct. 13, 2016

(65) Prior Publication Data

US 2017/0103230 A1 Apr. 13, 2017

Related U.S. Application Data

(60) Provisional application No. 62/241,062, filed on Oct. 13, 2015.

(51) Int. Cl.
| | |
|---|---|
| *G06F 7/04* | (2006.01) |
| *G06F 21/62* | (2013.01) |
| *G06F 17/30* | (2006.01) |
| *G06Q 10/10* | (2012.01) |
| *G06F 16/93* | (2019.01) |

(52) U.S. Cl.
CPC ......... *G06F 21/6245* (2013.01); *G06F 16/93* (2019.01); *G06F 17/30011* (2013.01); *G06Q 10/10* (2013.01)

(58) Field of Classification Search
CPC .............. G06F 21/6245; G06F 17/30011; G06Q 10/10
USPC ............................................ 726/28
See application file for complete search history.

(56) References Cited

U.S. PATENT DOCUMENTS

| | | | |
|---|---|---|---|
| 2002/0111946 A1* | 8/2002 | Fallon | G06Q 10/10 |
| 2005/0203815 A1 | 9/2005 | Abts, III | |
| 2012/0173588 A1* | 7/2012 | Rotter | G06F 21/62 707/802 |
| 2015/0254795 A1* | 9/2015 | Levin | G06Q 50/186 705/312 |
| 2016/0335456 A1* | 11/2016 | Esparza | G06F 21/6263 |

* cited by examiner

*Primary Examiner* — Samson B Lemma
(74) *Attorney, Agent, or Firm* — Sheppard, Mullin, Richter & Hampton LLP

(57) ABSTRACT

According to some embodiments, methods disclosed herein include: creating a user account for a first user; receiving identification information and one or more documents associated with the first user; associating one or more authorized users with the user account and receiving identification information associate with each authorized user; storing the identification information associated the first user, the one or more document associated with the first user, and the identification information associated with each authorized user; and assigning the user account a first status, wherein the one or more authorized users are not granted access to the user account when the user account is assigned the first status.

13 Claims, 11 Drawing Sheets

METHODS AND SYSTEMS FOR SECURE DOCUMENT MANAGEMENT

CROSS-REFERENCE TO RELATED APPLICATIONS

This application claims the benefit of U.S. Provisional Patent Application Ser. No. 62/241,062, filed Oct. 13, 2015, which is incorporated by reference herein in its entirety for all purposes.

TECHNICAL FIELD

Embodiments of the present invention relate generally to uniform document management, and more specifically to systems and methods for facilitating trusted management of documents comprising financial, investment, insurance, health, real estate, etc. information.

BACKGROUND

Pertinent information may be particularly described in documents corresponding to an originator, e.g., an individual who controls or owns assets or property described in the documents or is otherwise referenced in said documents. Over time, the control or ownership of assets or property described in the originator documents, or the control over the person/health of the originator may need to be transferred to successors (e.g., authorized users or entities). However, such transition may be both time consuming and expensive, as obtaining information about said assets, property, and health of the originator from particular third parties requires adherence to a multitude of different procedures instituted thereby, and often the repeated presentation of the originator documents and identifying information of the successors to said entities. Accordingly, there is a need in the art for systems, methods and computer program products that facilitate the aforementioned transition process and the interaction between successors and third parties.

SUMMARY

According to some embodiments, methods disclosed herein include: creating a user account for a first user; receiving identification information and one or more documents associated with the first user; associating one or more authorized users with the user account and receiving identification information associate with each authorized user; storing the identification information associated the first user, the one or more document associated with the first user, and the identification information associated with each authorized user; and assigning the user account a first status, wherein the one or more authorized users are not granted access to the user account when the user account is assigned the first status.

In some embodiments the methods disclosed herein may comprise receiving a request, by the first user, to modify at least one of the documents associated with the user, and granting the request in response to verifying the identity of the first user.

In some embodiments the methods disclosed herein may comprise associating each authorized user with at least one of the documents associated with the first user.

In some embodiments the methods disclosed herein may comprise changing a status of the user account from the first status to a second status in response to a first triggering condition, wherein the second status of the user account enables each authorized user to access and/or modify the one or more document with which the authorized used is associated provided the identity of the authorized used is verified. In some embodiments, the first triggering condition comprises at least one of: death of the first user, legal incapacity of the first user, and a record of the first user's consent to change the status of the user account.

In some embodiments the methods disclosed herein may comprise receiving a request, by at least one of the one or more authorized users, to access the user account and/or modify the one or more documents with which the authorized used is associated, and granting the request in response to verifying the identity of the least one of the one or more authorized users.

In some embodiments the methods disclosed herein may comprise changing the status of the user account from the second status to a third status in response to a second triggering condition, wherein the third status of the user account prevents each authorized user from accessing the user account until the identity thereof is verified.

In some embodiments the methods disclosed herein may comprise receiving a request, by at least one of the one or more authorized users, to access the user account and/or modify the one or more documents with which the authorized used is associated.

In some embodiments the methods disclosed herein may comprise changing the status of the user account from the third status to the second status in response to verifying the identity of the at least one of the one or more authorized users, and granting the request thereof.

BRIEF DESCRIPTION OF THE DRAWINGS

Exemplary embodiments of the invention may be more readily understood by referring to the accompanying drawings in which.

DETAILED DESCRIPTION

Figure 1:
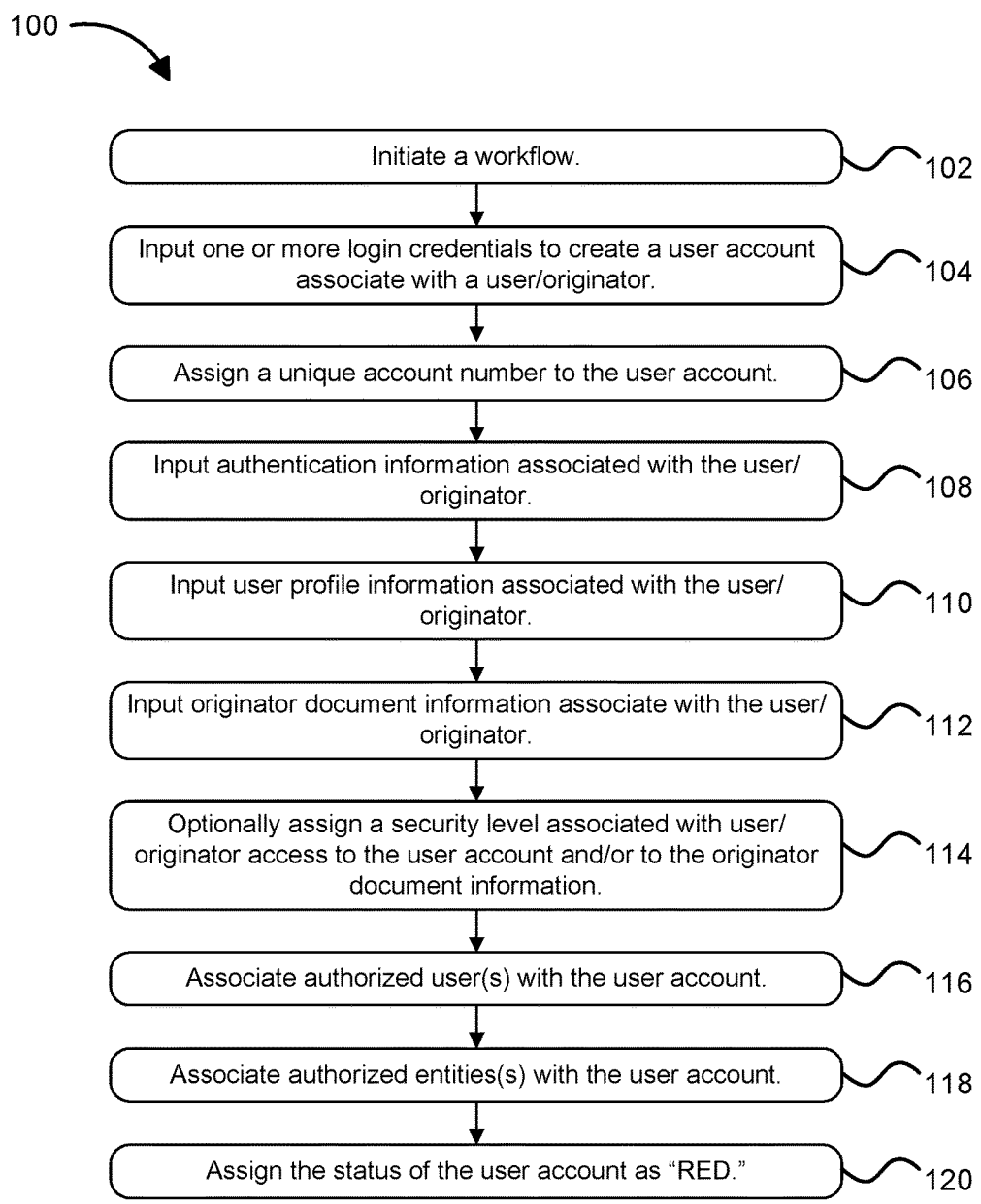
FIG. 1 illustrates a flowchart of a method for securely managing electronic documents, according to one exemplary embodiment.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises," "comprising," "include," "including," "has/have" and "having" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner.

Embodiments disclosed herein are directed to systems, methods, and computer program products for the secure management of documents associated with a user (specifically an "originator" as defined herein). In particular embodiments, a subscription service enables access to a centralized data management system comprising a database and at least one computing device (server). The database may be configured to store, update, modify, delete, etc. documents associated with originator, where such document may include financial documents, insurance documents, medical documents, real estate documents, durable power of attorney documents, trust documents, legal documents, legally significant documents (e.g., documents defining, modifying, or otherwise affecting the legal rights of at least the originator), etc. The subscription service may also provide access to an application (which may be accessed or downloaded or otherwise executed on a computing device, or a web-browser application, etc.) that may facilitate: the creation of a user account for the originator and the input/upload of documents associated with the originator; the identification of users ("successors") authorized to the control assets or property or make medical/health decisions affecting the originator as described in the documents upon one or more triggering conditions; and therefor provide a seamless means by which transition of such control is provided to the successors.

Entities (e.g., banks, hospitals, insurance companies, title companies, government agencies, etc.) may also utilize the aforementioned subscription service. For instance, each transaction involving the originator at one such entity, where such transaction comprises the provision of information associated with the originator (e.g., the creation of a will, recordation of a property title, creation of a trust document, etc.), may be associated with the originator's user account. The information exchanged during said transaction may be provided to the data management system for storage in the database thereof. Since such information is associated with the originator's user account, said information may automatically become part of the originator's user account (e.g., said information is accessible from said account), thereby ensuring that the estate, health/medical records/and all affairs of the originator is current and up-to-date.

One advantage of the novel systems, methods, and computer program products disclosed herein is the protection of the originator and information associated therewith against fraud and privacy right violations in every transaction, e.g., with entities described herein, as well as during the transition of control/management of certain originator information/documents to authorized successors.

In an exemplary embodiment, an originator may access one or more services of the data management system disclosed herein, where said access may optional require the payment of a subscription fee. Access to the service(s) of the data management system may comprise one or more of the following:

(i) creation, e.g., by the originator, of a user account;

(ii) input/uploading of identification information associated with the originator (e.g., birth certificate, naturalization papers, social security number, passport, driver's license, state issued ID, fingerprint impressions, facial recognition information, retinal scan, voice patterns, knowledge based identifying information such as answers to security questions, etc.);

(iii) input/uploading of documents pertaining to the estate, health, affairs, etc. of the originator (referred to as "originator documents"), including but not limited to trust(s), will(s), designation(s) of health representative, durable power of attorney document(s), medical records (e.g., health directives, end of life directive, do-not-resuscitate documents, etc.), real estate documents (lease agreements, title to property, etc.), patents, existing bank accounts, business agreements, etc.;

(iv) designation of successors authorized to act on behalf of the originator upon the occurrence of one or more triggering conditions (e.g., the death, legal incapacity, or voluntary decision by the originator, where said triggering conditions may also be specified/defined by the originator; and (v) input/uploading of identification information associated with the successors (e.g., birth certificate, naturalization papers, social security number, passport, driver's license, state issued ID, fingerprint impressions, facial recognition information, retinal scan, voice patterns, knowledge based identifying information such as answers to security questions etc.).

After completion of the above steps (i)-(v), the originator user account may be assigned a first status (e.g., a "RED" status), indicating that the originator is able to work on his/her own behalf (e.g., when the originator is mentally fit, not legally incapacitated, etc.). Originator information and documents associated therewith may be updated, modified, or expanded as needed to keep said information and documents current. Implementation of such an update, modification or expansion may require the provision of the originator's account number, and verification of one or more forms of identifying information associated with the originator to verify the originator's identity.

Further, upon the occurrence of the one or more triggering conditions, the originator's user account may be assigned a second status (e.g., a "GREEN") indicating that the authorized successors can now take over duties to help the originator, e.g., per the terms set forth in the originator documents. In some embodiments, the qualifying criteria for such transition may be verified by a third party (e.g., a lawyer) to ensure that the transition is legal. Moreover, in order for the authorized successor to actually act on behalf to the originator, the identity of the authorized successors may need to be verified according to methods disclosed herein.

Several general and specific embodiments pertaining to the aforementioned novel systems, methods and computer program products are described below.

User Account Creation/Initiation

Referring now to FIG. 1, a flowchart of a method 100 for securely managing electronic documents is shown according to one exemplary embodiment. The method 100 may include more or less operations than those described and/or illustrated in FIG. 1. Moreover, the order of operations described and/or illustrated in FIG. 1 is not limiting, and may be varied as would be appreciated by skilled artisans upon reading the present disclosure. Further, any of the features and operations described and/or illustrated in FIG. 1 may be used in any of the embodiments described herein, such as those described and/or illustrated in the other FIGS.

As shown in FIG. 1, a workflow is initiated by a user on a first computing device. See operation 102. In some embodiments, the workflow may be initiated and run at least in part using a processor of a computing device, wherein the computing system includes but is not limited to a desktop computer, a portable computer, a workstation, a personal digital assistant (PDA), a communications device, a telephony device, a mobile phone, a client, a server, a terminal, a local and/or remote device, a wired and/or wireless device, a web-based and/or Internet coupled device, an interactive television (TV) device, etc. In one embodiment, the user may initialize the workflow by executing a local software application or an online (web-based) application on a computing device, where the local or online application is associated with (e.g., operatively coupled to) a data management system via a network. In some embodiments, the data management system comprises a datastore/database and at least a second computing device (e.g., a server).

The database described herein may be any structure suitable for storing content items disclosed herein and associated metadata. The database may comprise a cache, a buffer, a relational database, an active database, a self-referential database, a table, a matrix, an array, a documented-oriented storage system, and the like.

A workflow may comprise a set of activities that proceed via a predetermined order or via a dynamic order as determined by stimuli (e.g., clicking a button, a tab, an item in a drop-down menu, etc. that presented on a user interface). The workflow may also comprise rules applied at predetermined instances or in response to stimuli. For instance, in one embodiment, a user may execute an application on a first computing device, with the application initiating a first activity and configuring the user interface. The user may interact with the user interface and complete the activity and/or provide stimuli, thereby triggering a rule and/or a next activity to be completed and/or a change to the configuration/design of the user interface. The application may access local services (e.g., services associated with the first computing device) and/or remote services such as access to a database management system located on a second computing device.

Upon initialization of the workflow, one or more login credentials are input by the user to create a user account. See operation 104. In some embodiments, the login credentials may include, but are not limited to, a username and a user password, each of which may independently include a set of characters selected from letters, numerals, alphanumeric characters, symbols, graphical icons, combinations thereof, etc. Additional login credentials, e.g., other than a user name and a user password, may also be required to create a user account in some embodiments, such as one or more of: email address(es) of the user, a physical address of the residence(s) of the user, home telephone number(s) associated with the residence(s) of the user, mobile/cellular telephone number (s) of the user, gender of the user, age of the user, billing information associated with the user, etc. In some embodiments, input of such additional information may only be required for the creation of the user account, and may not be required for subsequent access to the user account.

In response to creating a user account, a unique account number may be assigned thereto. See operation 106. The unique account number may comprise one or more characters such as letters, numerals, alphanumeric characters, symbols, graphical icons, combinations thereof, etc. It is of note that the assignment of a unique account number to the account number may occur at any step in the process depicted in FIG. 1.

As used herein, the individual to which the user account corresponds may be referred to as an "originator." Stated another way, an originator may refer to the individual who creates and activates the user account. An originator may also refer to the individual referenced by and/or associated with information provided in financial documents, insurance documents, medical documents, real estate documents, legal documents, legally significant documents (e.g., documents defining, modifying, or otherwise affecting the legal rights of at least the individual), etc. that are ultimately stored in the database of the data management system. For example, an originator may refer to the owner of assets specified in such documents.

While not shown in FIG. 1, after creation of the user account or assignment of the account number thereto, the user account may optionally be activated to enable access to further operations described in FIG. 1. For instance, in one embodiment, after creation of the user account or assignment of the unique account number thereto, the user session may be automatically terminated, i.e., the originator may be automatically "logged-out" of the user account. A unique code (e.g., password, token, etc.) may then be provided to the originator at an email address and/or a physical address and/or via a message (e.g., a SMS message) sent to the mobile telephone number(s) of the user specified during the creation of the user account. The originator may next input the one or more login credentials (e.g., the username and password) used to create the account, the account number (if applicable and required), and the unique code to activate said user account. In some embodiments, the unique code may be valid for a predetermined period of time. In embodiments where the user account is not activated using the unique code during the predetermined time period for which it is valid, a second unique code may be requested and provided to the originator at the specified email address and/or physical address and/or via message (e.g., a SMS message).

In another embodiment in which the user session may be automatically terminated after assignment of the account number to said user account, the originator may need to input only the one or more login credentials (e.g., the username and password) used to create the account in combination with the account number to activate said user account. In yet another embodiment in which the user session may be automatically terminated after assignment of the account number to said user account, the originator may need to input only the account number for login and activate said user account.

In some embodiments, any user session may be automatically terminated based on user input, after expiration of a predetermined time period, after expiration of a predetermined time period in which no activity occurs, after each operation described in FIG. 1, etc.

After activation of the account, one or more of the login credentials (not including the unique account number) may be optionally changed by the originator. In some embodiments, one or more login credentials may be required to be changed at predetermined intervals. In some embodiment, one or more login credentials may be required to be changed in instance where attempts to access the user account (i.e., login attempts) exceed a predetermined threshold (e.g., 2 login attempts, 3 login attempts, 4 login attempts, 5 login attempts, etc.).

While not shown in FIG. 1, a subscription fee may be required to utilize certain services of the database management system and the application associated therewith (e.g., operatively coupled thereto). The amount of the subscription fee may vary depending on the number and type of services offered by the application and data management system. Various subscription fee options may be thus presented to the originator, each subscription fee option corresponding to a subscription level denoting a particular number and type of services offered by the application and data management system. Accordingly, the originator may interact with a user interface of the application to select the desired subscription fee and corresponding subscription level. In some embodiments, the subscription level may be changed, at any time, e.g., by the originator, by selecting a different subscription level and paying the corresponding subscription fee. In embodiments where it is determined that subscription fee payments are less than what is required for the corresponding subscription level and/or the subscription fee payments are delinquent (not timely), the subscription level may be automatically changed (e.g., reduced to a lower level). The conditions for triggering the automatic change of the subscription level (e.g., one instance of an insufficient or delinquent subscription fee payment, two instances of an insufficient or delinquent subscription fee payment, etc.) may be specified/predetermined by the application and/or data management system.

In some embodiments, selection of the desired subscription level may occur prior to creation of the user account. The originator may first be required to select a particular subscription level, after which the user may be input the one or more login credentials to establish the user account. However, in some embodiments, selection of the desired subscription level may occur after creation of the user account and/or after activation thereof.

With continued reference to FIG. 1, authentication information associated with the originator is stored in the database of the data management system. See operation 108. In some embodiments, the originator may interact with a user interface displayed on the first computing device to input the authentication information to the database (see, e.g., FIG. 2A, and the accompanying description thereof). In particular, the originator authentication information may be transferred to the database of the data management system, e.g. via a network connection. As indicated previously, the data management system may comprise a second computing device (e.g., a server) on which the database is stored and managed according to some embodiments.

As used herein, originator authentication information refers to any type of information that authenticates or verifies the originator's identity. In some embodiments, originator authentication information may be classified/categorized in distinct categories, including, but not limited to, (i) information depicted in identity documents such as a driver's license, state issue identification (ID), passport, social security card, birth certificate, naturalization papers, etc.; (ii) biometric-based information such as ocular characteristics (e.g., retinal vein patterns, iris striations, etc.) which may be determined, e.g., by a retinal scan; facial characteristics (e.g., distance measured between features of an individual's face such interpupillary distance) which may be determined, e.g., by a recognition scan; voice recognition patterns/characteristics, fingerprint(s), palm print, etc.; and (iii) knowledge-based information such as answers to predetermined security questions.

In some embodiments, storage of originator authentication information from at least one of the aforementioned categories in the database of the data management system may be required. For instance, storage of one or more identity documents associated with the originator in the database may be required in one such embodiment. In another such embodiment, storage of one or more biometric-based characteristics of the originator in the database may be required. In yet another such embodiment, storage of knowledge-based information to the database may be required, such as an originator specified answer to at least one predetermined security question. In an additional embodiment, the storage of authentication information from at least two categories (e.g., categories (i) and (ii); categories (i) and (iii); or categories (ii) and (iii)) in the database may be required. In a further embodiment, storage of authentication information from all three of the aforementioned categories (e.g., categories (i), (ii), and (iii)) in the database may be required.

In some embodiments, the category(ies) of originator authentication information and/or the type and/or number of originator identification materials within said category(ies) may be predetermined (e.g., specified) by the data management system and/or the application associated therewith (e.g., operatively coupled thereto). In one such embodiment, the originator may interact with a user interface that provides a selectable menu listing the possible categories of originator authentication information. In response to selection of a category of originator authentication information, a second selectable menu may be provided listing the possible originator identification documents/materials associated with the selected category. In further response to selection of the type of originator identification document/material, one or more fillable fields may be presented in which relevant information described in the originator identification document/material may be input. In some embodiments, the originator may input the relevant information in the fillable fields. However, in some embodiments, the one or more fillable fields may be automatically populated by the data management system and/or the application, as discussed in greater detail, infra. Further, in some embodiments, an image or electronic representation of the originator identification document/material may be input/uploaded to, and stored in, the database of the data management system and classified accordingly.

Figure 2A:
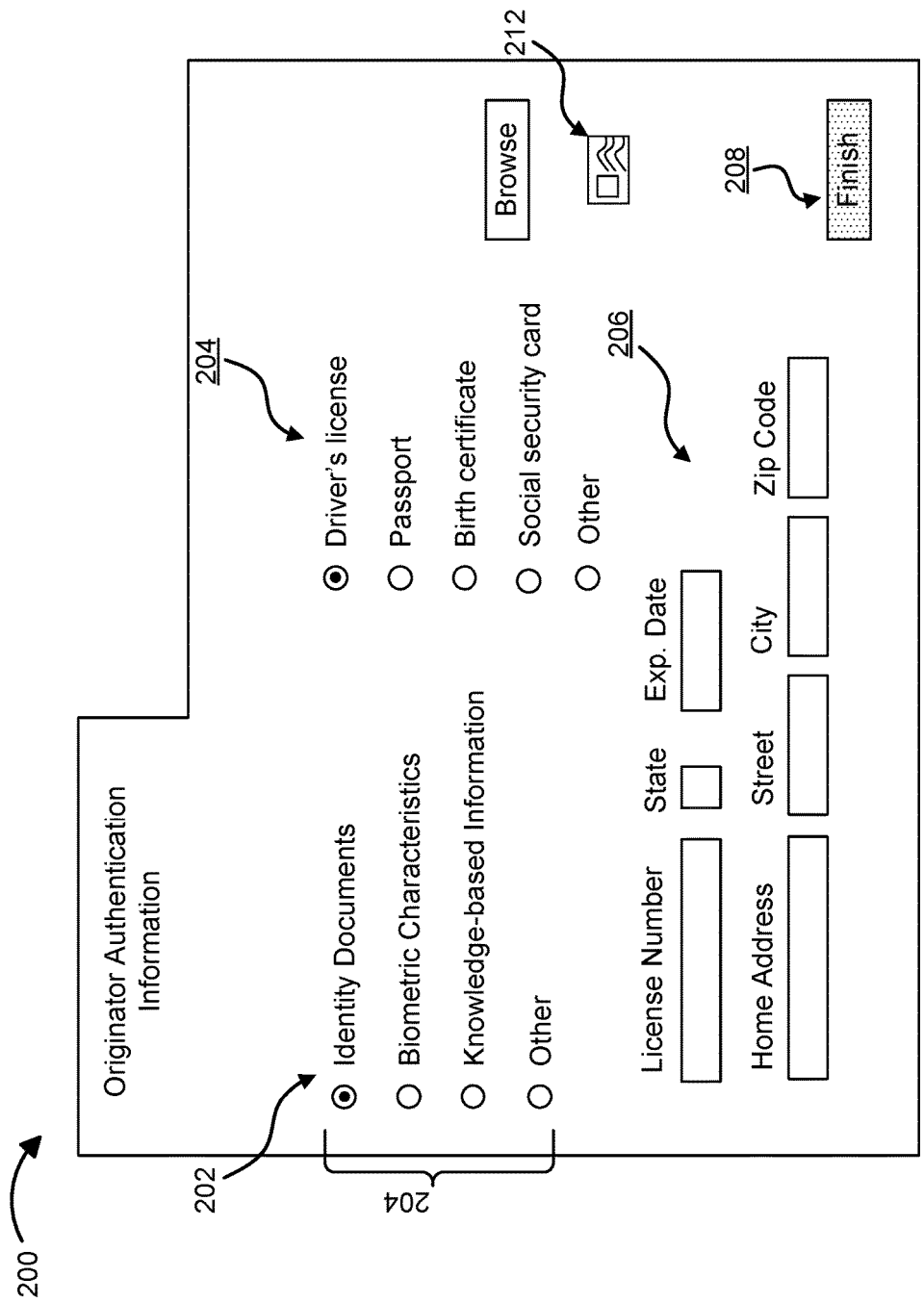
FIGS. 2A-2B illustrates a simplified representation of a user interface for facilitating input of originator authentication information, according to one exemplary embodiment.

FIG. 2A illustrates an exemplary embodiment of a user interface 200 for facilitating input of originator authentication information for storage in database of the data management system. As shown in FIG. 2A, the user interface 200 may graphically display a separate tab or window labeled "Originator Authentication Information," where said tab or window may comprise an exemplary menu regarding the types of originator authentication information that may be selected and stored to the database. As also shown in FIG. 2, a menu 202 may list the three categories 204 of originator authentication information discussed above, as well as an "Other" category which may be defined/labeled based on user input. In response to the selection of the "identity document" category, a sub-menu 204 listing various types of identity documents is provided. This sub-menu 204 may also include a selection labeled "Other" which may be defined/labeled based on user input. In response to the selection of the "driver's license" entry, fillable fields 206 corresponding to license number, issuing state, expiration date, birth date, address (street, city, an state, zip code), etc. are presented. It is of note that the format of the menu 202 and sub-menu 204 is not limited to that shown in FIG. 2A, and may include a drop-down format or any suitable format as known in the art.

Figure 2B:
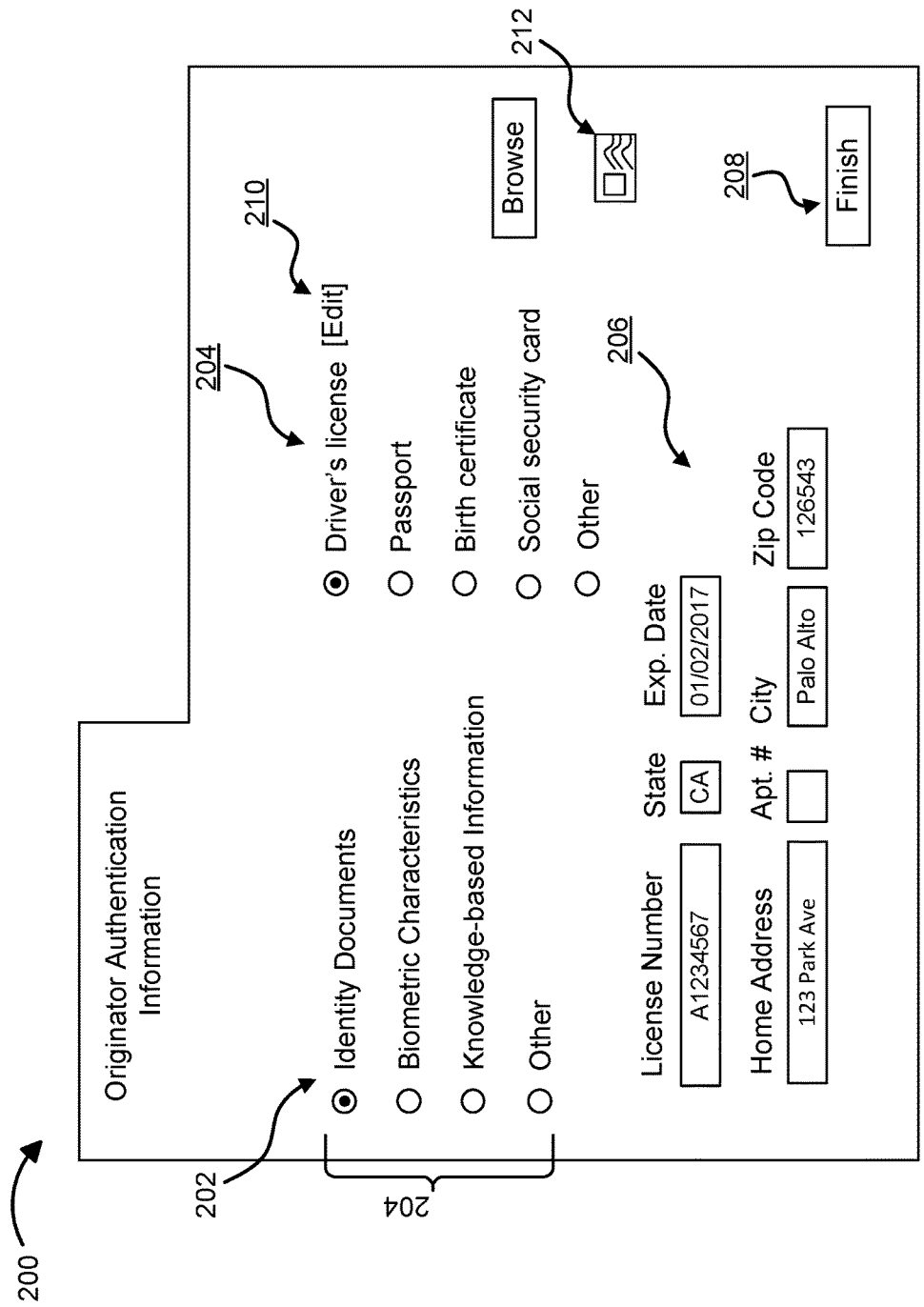

As indicated above, the originator may input the relevant information from the originator's driver's license in the fillable fields 206. The originator may indicate that the desired information has been filled in the fillable field(s) 206 by selecting an indicator 208 (e.g., labeled "Complete," "Finish," or the like). In response to the selection of such an indicator 208, the information associated with the originator's license may not be modified or added thereto until the originator indicates otherwise (e.g., by selecting an indicator 210 labeled "edit," "modify" or the like). FIG. 2B provides one example of the originator interface 200 after input/upload, e.g., to the database, of an image or electrical representation of the originator's driver's license and relevant information associated therewith, and selection of the indicator 208.

With continued reference to FIG. 2A, the fillable fields 206 may be automatically populated by the data management system and/or the application associated therewith (e.g., operatively coupled thereto), in various embodiments.

For instance, in some embodiments, an image of the originator driver's license or an electronic representation of the originator driver's license (e.g., in portable document format (PDF), Microsoft Word format, etc.) may be provided to the data management system, and stored in the database thereof. In one such embodiment, the image or electronic representation of the originator's license may be locally stored in the memory of the first computing device. Accordingly, said image or electronic representation may be input/uploaded via selection of a "browse" indicator 210 (e.g., a button) that enables said image or electronic representation to be located on the first computing device, and uploaded to the data management system for storage in the database thereof. In another embodiment, the image or electronic representation of the originator's license may be retrieved from a data source associated with a third computing device, where the first, second, and third computing devices may be operatively coupled via a network, and where the third computing device may be distinct from the first computing device and/or the second computing device associated with the data management system.

As indicated above, the image or electronic representation of the originator's driver's license may be provided to the data management system and stored in the database thereof. As shown in FIG. 2A, the user interface 200 may comprise a reference 212 (e.g., an icon, label, etc.) to the uploaded image or electronic representation of the driver's license, where selection of the reference 212, e.g. by clicking thereon, may retrieve the image or electronic representation of the driver's license from the database for display within the appropriate tab of the user interface 200 or in another window thereof.

In some embodiments an image of the originator's driver's license may be captured by a capturing component (e.g., a camera) of an external device (e.g., a mobile phone, a scanner, a copy machine, etc.) operatively coupled to the first computing device, and subsequently transferred to the first computing device. In some embodiments, the image of the driver's license may be captured by a capturing component associated with the first computing device (e.g., a camera integrated with the first computing device).

The image of the originator's driver's license may be classified, e.g., using the data management system and/or the application associated therewith (e.g., operatively coupled thereto), according to a document/ID type and analyzed based at least in part on the document/ID classification. In particular, the captured image of the originator's driver's license may be classified based on document identifiers that identify the type of document itself, rather than the identity of the individual to which the document corresponds. Exemplary document identifiers associated with the a driver's license may include, but are not limited to, a license number, dates (e.g., expiration date, birth date), a hologram, symbols, the presence of a picture, etc. While the data management system and/or the application may be configured to automatically classify the captured image of the driver's license based on one or more document identifiers associated therewith, the classification of the driver's license may alternatively be identified based on user input.

It is of note that a captured image of any type of originator authentication information described herein may be classified according to document identifiers such as numbers associated with particular documents (e.g., driver's license number, passport number, etc.); dates associated with particular documents (e.g., issue dates, expiration dates, etc.); and symbols, patterns, logos, characters, emblems, barcodes, security codes, etc. associated with particular documents.

After classification of the captured image of the driver's license and analysis thereof in view of said classification, information associated with the originator's identity described in the driver's license may be extracted. One or more of the fillable fields 206 shown in FIG. 2A may be automatically populated with the extracted information. The determination of the document identifiers to classify the driver's license and extraction of identifying information associated with the originator may be achieved using optical character recognition (OCR) and/or other image processing techniques as known in the art.

In some embodiments, the identifying information of the originator as described in the originator's driver's license, the image of the originator's driver's license and the classification thereof may be stored in said database.

It is important to note that the originator may select more than one category of originator authentication information, and may select more than one type of identifying document/ material associated with the selected category. For instance, the originator may select "identity document" as the category of originator authentication information, and further select one, two, three, four or more types of identity documents, where identifying information associated with each type of identity document is provided to and stored in the database of the data management system. The originator may alternatively or additionally select the "biometric information" authentication information category, and provide identifying information associated with one or more biometric characteristics to the data management system of storage in the database thereof. The originator may alternatively or additionally select the "knowledge-based" authentication information category and store answers to the predetermined security questions, and/or store both the security questions and the answers to the database.

It is also important to note that FIG. 2A provides but one example of a user interface 200 for facilitating the input of originator authentication information to the database of the data management system, and is not limiting in any way. Accordingly, in some embodiments, selection of a category of originator authentication information from menu 202, and subsequent selection of a type of identifying document/ material from sub-menu 204 may not result in the display of fillable fields 206. Rather, selection, e.g., of the "identity category" of originator authentication information from menu 202, and subsequent selection of "driver's license" from the sub-menu 204 may rather prompt the originator to input/upload an image of the originator's driver's license, or otherwise provide an electronic representation of the originator's driver's license for upload to the database.

In some embodiments, selection of a category of originator authentication information from menu 202 may not prompt the display of the sub-menu 204 listing various types of identity documents associated with the selected category. Rather, selection, e.g., of the "identity category" of originator authentication information from menu 202 may prompt the display of one or more fillable fields in which the originator may input the classification (type/identity) of a particular identity document, optionally input relevant originator identifying information described in the particular identity document in the one or more fillable fields (if present), and input/upload an image or electronic representation of the particular identity document. In other embodiments, selection, e.g., of the "identity category" of originator authentication information from menu 202 may not result in the display of the sub-menu 204 or the provision of any fillable fields, but may rather prompt the originator to solely input/upload an image of the identifying document/material associated with the selected category, or otherwise provide an electronic representation of the identifying document/ material for upload to the database.

In some embodiments, the user interface 200 for the "Originator Authentication Information" tab or window may not include any selectable menu. In one such embodiment, the "Originator Authentication Information" may solely comprise one or more fillable fields in which the originator may input relevant information, such as the classification (type/identity) of a particular identity document and/or originator identifying information described in the particular document. The originator may also be prompted to input/ upload an image or electronic representation of the particular identifying documents/materials described in the fillable fields to the database of the of the data management system.

In some embodiments, the user interface 200 for the "Originator Authentication Information" tab or window may solely comprise an area that facilitates/prompts the input/ upload of an image or electronic representation of the originator identifying document/material to the database of the data management system. In one such embodiment, in response to the upload of the image or electronic representation of the originator identifying document/material to the database, the originator identifying document/material may be classified by the originator, the data management system, and/or the application (as described previously), and labeled according to said classification.

While not shown in FIG. 2A, selection of the "knowledge-based" originator authentication information category from menu 202 may result in the display of one or more predetermined security questions and corresponding fillable field(s) in which the originator may input the answer(s) thereto. In some embodiments, the number of security questions may be specified by the data management system and/or the application associated therewith (e.g., operatively coupled thereto) or defined by the originator. In some embodiments, the security questions themselves may be determined by the originator. In some embodiments, the "knowledge-based" originator authentication information may comprise one or more security questions determined by the data management system and/or the application, and one or more security questions determined by the originator.

While also not shown in FIG. 2A, selection of the "biometric information" from the menu 202 may result in presentation of a sub-menu listing various types of biometric characteristics, e.g., ocular characteristics, facial characteristics, fingerprint characteristics, etc. Selection of a type of biometric characteristic may result in the presentation of one or more fillable fields in which respective information as to the biometric characteristic may be input. For instance, if "facial characteristics" is selected, information related to the facial characteristics of the originator (e.g., interpupillary distance) may be input into the one or more fillable fields if known. Moreover, an image or electronic representation of a facial recognition scan may also be input/uploaded to the database of the data management system. In some embodiments the facial recognition scan may be captured by a capturing component (e.g., a camera) of an external device operatively coupled to the first computing device, and subsequently transferred to the first computing device. In some embodiments, the facial recognition scan may be captured by a capturing component associated with the first computing device (e.g., a capturing component integrated with the first computing device). In some embodiments, the facial recognition scan may be obtained/received from a third party data source.

In some embodiments, the facial recognition scan may be classified and analyzed according to the processes described above (e.g., with respect to the classification and analysis of the originator's driver's license). In further embodiments, identifying information from the facial recognition scan may be extracted by the data management system and/or the application associated therewith (e.g., operatively coupled thereto), and used to automatically populate relevant fillable fields. For example, the interpupillary distance may be determined from the analysis of the facial recognition scan by the data management system and/or application, and presented in a fillable field. It is important to note that all variations described herein with respect to selection of "identify documents" apply to the selection of "biometric information" as would be appreciated by skilled artisans upon reading the present disclosure.

With continued reference to FIG. 1, originator profile information associated with the originator may optionally be input to create an originator profile. See operation 110. The originator profile information may be transferred to the data management system, e.g. via a network connection, and stored in the database associated therewith.

Originator profile information may include, but is not limited to email address(es) associated with the originator, a physical address of the residence(s) of the originator, home telephone number(s) associated with the residence(s) of the originator, mobile/cellular telephone number(s) of the originator, billing information associated with the originator, emergency contact information, medical information of the originator (e.g., known allergies, medical conditions, blood type, gender, race, age, etc.), place of work of the originator, etc.

In some embodiments, the type of originator profile information which may be input to create the originator profile is specified/defined by the data management system and/or the application associated therewith (e.g., operatively coupled thereto). For example, in one such embodiment, the originator may interact with a user interface that provides a selectable menu listing types of personal information for the originator profile. Upon selection of a type of personal information, one or more fillable fields may be presented in which the originator may input the relevant information.

Figure 3:
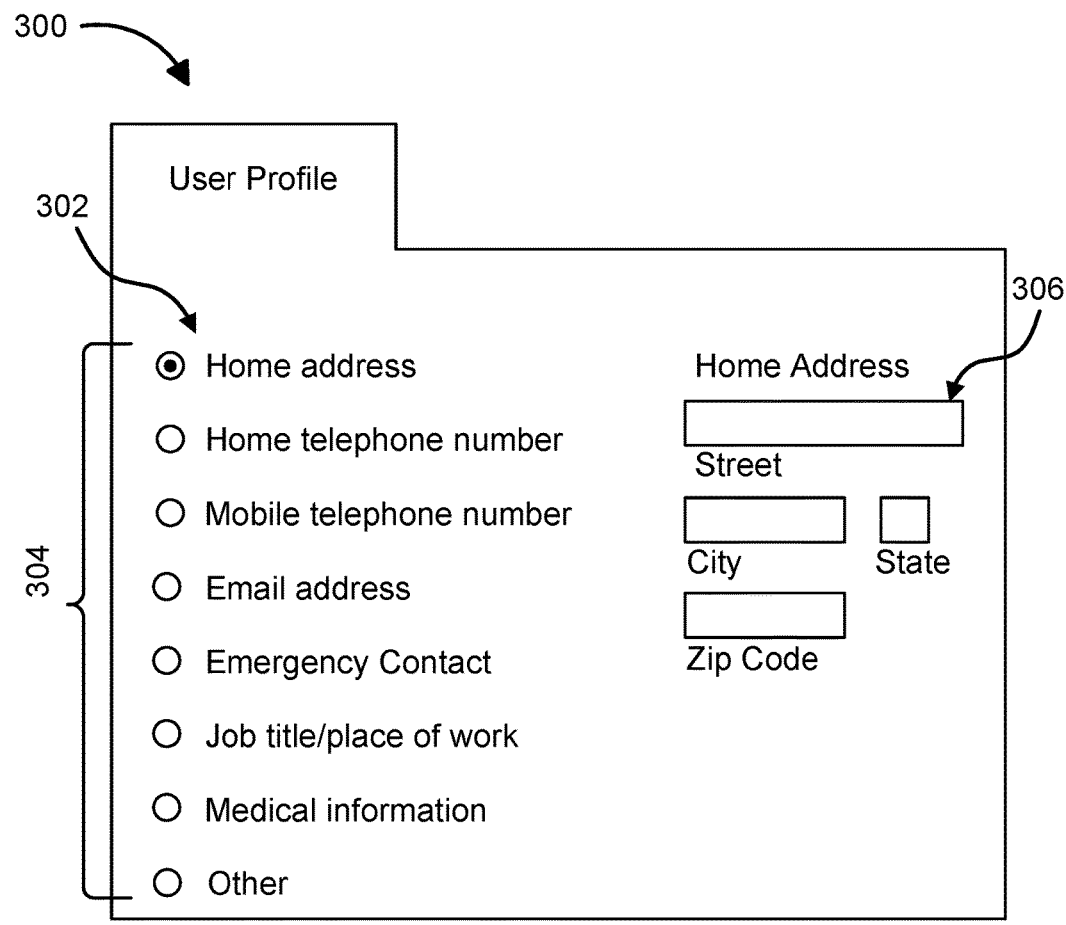
FIG. 3 illustrates a simplified representation of a user interface for facilitating input of originator profile information, according to one exemplary embodiment.

FIG. 3 illustrates an exemplary embodiment of a user interface 300 for facilitating provision of originator profile information to the database management system for storage in the database thereof. As shown in FIG. 3, the user interface 300 may graphically display a separate tab or window labeled "Originator Profile," where said tab or window may comprise an exemplary menu regarding the types of originator profile information that may be input therein. As also shown in FIG. 3, a menu 302 provides various selectable entries 304 related to originator profile information, as well as an "Other" category which may be defined/labeled based on user input. Upon selection of the "physical address" entry, fillable fields 306 corresponding to street, city, state, zip code, etc. may be presented.

In some embodiments, an image or electronic representation of a document depicting originator profile information (e.g., an image of medical records, an image of a driver's license, etc.) may be input/uploaded to the database of the data management system in a similar fashion as described above regarding the input/uploading of images or electronic representation of originator authentication information. For instance, in one embodiment, the image or electronic representation of a document depicting/comprising originator profile information may be stored locally on the first computing device. Accordingly, said image or electronic representation may be input/uploaded to the database via selection of a "browse" indicator (e.g., a button) that enables said image or electronic representation to be located on the first computing device, and transferred to the data management system for storage in the database thereof. In another embodiment, the image or electronic representation of said document may be retrieved from a data source associated with a third computing device via a network connection, where the first, second and third computing devices may be operatively coupled with one another, and where the third computing device, and where the third computing device may be distinct from the first computing device and/or the second computing device associated with the data management system.

Moreover, in some embodiments, the image or electronic representation of the document depicting/comprising originator profile information may be classified and analyzed according to the processes described above (e.g., with respect to the classification and analysis of the originator's driver's license). In further embodiments, identifying information from the image or electronic representation of the document depicting/comprising originator profile information may be extracted by the data management system and/or the application associated therewith (e.g., operatively coupled thereto), and used to automatically populate relevant fillable fields.

In some embodiments, one or more fillable fields of the "Originator Profile" tab or window may be automatically populated based on the information associated with additional login credentials and/or originator authentication information. As an example, consider an embodiment in which the originator was required to input a home address as an additional login credential to create the user account. Assuming that the Originator Profile tab or window comprises a fillable field labeled "home address," said field may be automatically populated with the information provided for the home address during the creation of the originator profile.

In some embodiments, the originator profile information and any corresponding images/electronic representations associated therewith may be transferred to and stored in the database of the data management system.

With continued reference to FIG. 1, originator document information associated with the originator may be stored in the database of the data management system. See operation 112. Originator documents may include, but are not limited to, financial documents, insurance documents, trust documents, real estate documents, medical documents, legal documents, legally significant documents (e.g., documents defining, modifying, or otherwise affecting the legal rights of originator), etc. Illustrative examples of originator documents include living trusts, living revocable trusts, trust fund accounts, durable power of attorney (DPOA) documents, will(s), medical records (e.g., end of life directives, do-not-resuscitate documents), documents describing bank account information, land/property leases, life insurance policies, car insurance policies, health insurance policies, etc.

In some embodiments, originator documents may be classified/categorized in distinct categories, including but not limited to: (i) banking information; (ii) trusts; (iii) wills; (iv) medical records; (v) insurance policies; (vi) real estate, etc. In one embodiment, the categories of the originator documents may be predetermined (e.g., specified) by the data management system and/or application associated therewith (e.g., operatively coupled thereto). In some embodiment, all categories may be graphically displayed in the same tab or window, or each category may be graphically displayed in a separate tab or window. In one embodiment, the categories of originator documents may be specified based on user input.

Figure 4:
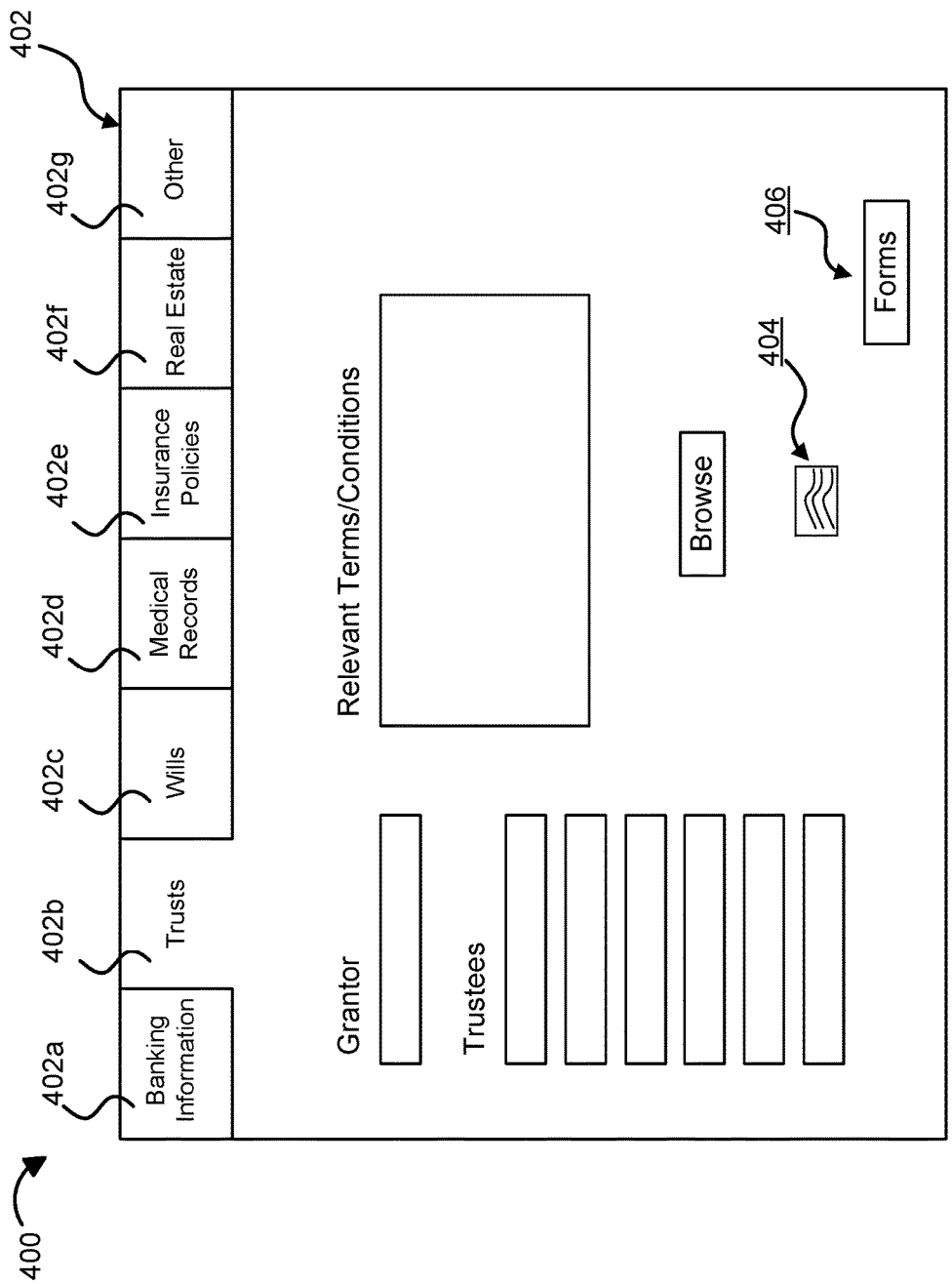
FIG. 4 illustrates a simplified representation of a user interface for facilitating input of originator documents, according to one exemplary embodiment.

FIG. 4 illustrates an exemplary embodiment of a user interface 400 for facilitating input of originator documents for storage in the database of the data management system. As shown in FIG. 4, the user interface 400 may graphically display a separate tab 402 (or window) for each originator document category. In the embodiment illustrated in FIG. 4, the originator document categories (and corresponding tabs) include: Banking Information 402a; (ii) Trusts 402b; (iii) Wills 402c; (iv) Medical Records 402d; (v) Insurance Policies 402e; (vi) Real Estate 402f; and Other 402g, which may defined by the originator and/or serve as a catch-all for originator documents that do not fall within the other originator document categories.

In some embodiments, one or more optional menus may be graphically displayed on an originator document tab 402, where said menus list one or more types of documents associated with the originator document tab 402. For instance, the Medical Records tab 402d may include a menu listing particular types of medical records, such as: end of life directives, do-not-resuscitate instructions, immunization records, surgical records, etc.

In some embodiments, one or more fillable fields may be graphically displayed an originator document tab 402, where the fillable field(s) may be input with relevant information described in particular originator documents failing within the category defined by the originator document tab 402. As an example, relevant information for a trust document may include the identity of the individuals whose assets and property are described in the trust, the identity of successors authorized to control one or more of the assets and property described in the trust, the specific conditions of the trust (e.g., triggering conditions that enable the succors to begin managing the assets and property in accordance to the trust), etc.

While not shown in FIG. 4, an originator document tab may comprises one or more areas, sub-tabs, etc. for specific types/categories of originator documents associated therewith, in some embodiments. For instance, the Banking Information tab 402a may comprise various areas, sub-tabs each of which may correspond to a type/category falling within banking information, such sub-tabs for safe-deposit box information, bank account, loans, etc. Similarly, the Medical Record tab 402d may comprise various areas, sub-tabs each of which may correspond to a type/category falling within medical information, such sub-tabs for allergy information, end of life information (e.g., do-not-resuscitate instructions, end of life directives, etc.), surgeries, etc.

In various embodiments, relevant information associated with originator documents may be input into fillable field(s) by the originator. In other embodiment, such information may be automatically populated in fillable field(s) by the data management system and/or the application associated therewith (e.g., operatively coupled thereto).

In some embodiments, an image or electronic representation of an originator document may be input/uploaded to the database of the data management system, and associated with its respective originator document tab 402. In one such embodiment, the originator may select a specific originator document tab 402, and input/upload, to the database, an image of one or more originator documents that correspond to the category of the specific originator tab 402. For instance, the originator may select the Trust tab 402b and input/upload, to the database, an image or electronic representation of a revocable trust pertaining to the property and assets of the originator. The image or electronic representation of the revocable trust may be input/uploaded utilizing various processes disclosed herein. For example, in one embodiment, the image or electronic representation of the revocable trust may be stored locally on the first computing device. Accordingly, said revocable trust may be input/uploaded by selecting a "browse" button on the Trust tab 402 that enables the image or electronic representation of the revocable trust to be located on the first computing device, and transferred to the data management system for storage in the database thereof. In another embodiment, the image or electronic representation of the revocable trust may be retrieved using, e.g., a network connection, from a data source associated with a third computing device, wherein the first, second and third computing devices may be operatively coupled to one another (e.g., via a network), and where the third computing device may be distinct from the first computing device and/or the second computing device associated with the data management system.

In some embodiments, the image or electronic representation of the originator document may be classified and analyzed according to the processes described herein (e.g., with respect to the classification and analysis of the originator's driver's license). For instance, in response to receiving an image or electronic representation of a revocable will, the revocable will may be classified (e.g., classified as "will" or "revocable will"), and analyzed based on said classification. Such classification and analysis of the originator document by, e.g., the data management system and/or the application associated therewith (e.g., operatively coupled thereto), may be beneficial in instances where the originator has selected an originator document tab 402 that does encompass the originator document being input/uploaded and/or in instances where the originator chooses not to navigate to an originator document tab 402 prior to inputting/uploading the image or electronic representation of the originator document. In both instances, the application may verify that the image or electronic representation of the originator document is associated with the correct originator document tab 402 or associate the image or electronic representation of the originator document to the correct originator document tab 402 if necessary. In additional embodiments, identifying information from the image or electronic representation of the revocable will may be extracted by the data management system and/or the application, and optionally used to automatically populate relevant fillable fields (if present).

In some embodiments, an image of the originator document may be captured by a capturing component (e.g., a camera) of an external device (e.g., a mobile phone, a scanner, a copy machine, etc.) operatively coupled to the first computing device, and subsequently transferred to the first computing device. In some embodiments, the image of the originator document may be captured by a capturing component associated with the first computing device (e.g., a camera integrated with the first computing device).

In some embodiments, the image or electronic representation of each originator document may be transferred to and stored in the database of the data management system. As shown in FIG. 4, the Trust tab 402b may comprise a reference 404 (e.g., an icon, label, etc.) to the uploaded image or electronic representation of an originator document falling within the "trust" category, where selection of the reference 404, e.g. via clicking thereon, may retrieve the image or electronic representation of the originator document from the database for display within the user interface 400 or in another window.

In some embodiments, after images or electronic representations of originator documents are input/uploaded to the database of the data management system, and relevant information from said images or electronic representations is provided in fillable fields (if present), an indicator labeled "Complete," "Finish," or the like may be selected. In response to the selection of such an indicator, the images or electronic representations of originator documents and the relevant information associated therewith may not be modified or added thereto until the originator (or authorized user/entity as described infra) indicates otherwise (e.g., by selecting an indicator labeled "edit," "modify" or the like). In further embodiments, selection of an "edit" indicator to modify the images or electronic representation of originator documents and the relevant information associated therewith may require additional operations prior to allowing the desired modification to proceed, where such additional operations may include verification of authentication information associated with the originator (or authorized user/entity as described infra).

In some embodiments, pre-made fillable electronic forms may be stored in the database of the data management system and provided to the originator when requested. Such electronic forms may include, but are not limited to, trust forms, financial forms (e.g., mortgage agreements, tax forms, etc.), wills, real estate forms (e.g., lease agreements), health/medical forms (e.g., health directives, do-not-resuscitate forms, etc.), insurance forms (e.g., car insurance forms, health insurance forms, renter insurance forms, etc.), etc. Such electronic forms may include one or more empty fillable fields in which the originator may fill in the relevant information. In some embodiments, the originator may interact with the user interface of the aforementioned application (e.g., 400 of FIG. 4) to request such electronic form, where such request may be initiated on a particular originator document tab 402 to which the form pertains. For instance, the originator may wish to create a trust. Accordingly, the originator may navigate to the Trusts tab 402b displayed via the user interface 400, and select an indicator 406 (e.g., a button) to request a premade fillable electronic trust form. Selection of the indicator 406 may result in the display of a menu listing various types of trust documents that the user may select. The selection of a particular trust document, such as a revocable living trust, from the menu may be communicated to the data management system, and the data management system may subsequently provide a living revocable trust electronic from to the originator, where the living revocable trust electronic form may be displayed within the Trusts tab 402b of the user interface 400 or in a separate window. After the originator has filled in the fillable fields of the living trust electronic form with the relevant information, the originator may indicate the completion of the electronic form, e.g., by selecting a "Completed" or "Finish" indicator provided in the electronic form. The completed electronic living revocable trust form may then be stored in the database of the data management system. In some embodiments, the originator may also receive an option to print the revocable living trust form prior to completion or after completion thereof.

In another embodiment, upon selection of the indicator 406, no menu may be displayed but rather a fillable field in which the originator can specify a particular electronic form. This query may then be provided to the data management system, thereby prompting the data management system to initiate a search, in the database thereof, for an electronic document matching the query. Upon finding an electronic form that matches the form specified in the originator's query, said electronic form may be provided to the originator.

With continued reference to FIG. 1, operation 114 includes optionally assigning a security level associated with access to the user account, and/or the originator's access to originator document information input/uploaded to the database of the data management system. As used herein, security levels affecting the originator's access and/or activities with respect to the user account may be referred to as "originator security levels." As also used herein, a "general security level" may refer to security levels that apply to all individuals who may access and use the user account, such as an originator or authorized user or authorized entity. Note, authorized users and entities are described in greater detail, infra.

In one embodiment, a general security level may be associated with a user's ability to access the user account. The general security level may identify the number and type of login credentials (e.g., username, password, email address, account number, mobile telephone number, etc.) needed to access the existing user account, in some embodiments. For instance, to access the user account, the general security level may require: input of the account number assigned to the user account; or input of the username used to create the user account (or an updated username if such was subsequently changed) and the account number; input of the aforementioned username and a corresponding password; or input of the aforementioned username and corresponding password, as well as the account number, etc. In one particular embodiment, the general security level may require only input of the user account number to access the user account. In some embodiments, the user interface on which the login process occurs may include a menu listing classifications of individuals who may access a user account, such as "originator," "authorized user," "authorized entity," etc., where access to the user account requires selection from one such classification. The originator may thus select the "originator" classification, in addition to the input of other required login credentials to access the user account.

The originator may interact with a user interface of the application to determine the general security level, or the general security level may be specified by the application according to a default setting, based on the subscription level associated with the user account, etc. The general security level may be assigned and changed at any time.

In one embodiment, an originator security level may be associated with the originator's access to originator document information input in designated areas (e.g., fillable fields) of a user interface associated with the application executing on the first computing system, and stored in the database of the data management system. Access to the originator document information may comprise viewing, modifying, deleting, etc. existing originator document information, as well as adding new originator documents. The originator security level may identify the number and type of originator authentication information (e.g., identity documents, biometric information, and knowledge-based information) that need to be verified prior to allowing the originator's access to said originator documents.

For example, to access the originator document information, the originator security level may require verification of at least one identity document/material/characteristic associated with the originator (e.g., the originator's driver's license), where such verification comprises comparing a received image or electronic representation of the identity document/material/characteristic to the existing image or electronic representation of the identity document/material/characteristic stored in the database of the data management system. Consider one such illustrative embodiment in which the originator wishes to access his/her account to modify existing originator document information and/or to add new originator document information, and where the originator security level for such access requires verification of the originator's driver's license. Accordingly, to gain such access after logging into the user account, the originator may input/upload an image of the originator's driver's license. The received image or electronic representation of the originator's driver's license may be classified and analyzed using the techniques described herein, and the information extracted therefrom may be compared to the existing information associated with the originator's driver's license that is already stored in the database of the data management system. In some embodiments, the comparing may be achieved by the data management system and/or the application associated therewith (e.g., operatively coupled thereto), or a third party computing device distinct from the first computing device.

In another embodiment, the verification process may alternatively, or additionally, involve approval by a third party (e.g., a lawyer or other such individual). For instance, returning to the example above, to gain access to originator document information, the originator's driver's license may be presented to the third party either in original form or as a copy (e.g., an image or electronic representation thereof). The image or electronic representation of the originator's driver's license as stored in the database of the data management system may also be accessed and displayed on a graphical user interface. The third party may then compare the driver license as presented by the originator and the image or electronic representation of the originator's driver's license as stored in the database. In response to a determination that substantially all or a predetermined percentage (e.g., at least 85%, at least 90%, at least 93%, at least 95%, at least 98%, at least 99%, at least 99.99%, or 100%) of the information depicted in the driver license as presented by the originator matches the information depicted in the image or electronic representation of the originator's driver's license as stored in the database, an indicator indicating that a valid verification occurred may be selected. Such an indicator may represent a button labeled "Verified" or "Verification Approved" or the like. Selection of said indicator may further require the input of identifying information associated with the third party (e.g., an electronic signature, name, address, telephone number, license number, social security number, an image or electronic representation of an identity document associated with the third party) and/or a timestamp associated with said verification so as to provide a record as to who verified the identification information of the originator and when said verification occurred.

It is important to note that the originator security level may require the verification of any originator identity document described herein, any originator biometric characteristic described herein, any originator knowledge based authentication information described herein (e.g., the provision of answers to predetermined security questions), and combinations thereof.

In some embodiment, the originator may interact with a user interface of the application to determine the originator security level, or the originator security level may be specified by the data management system and/or application according to a default setting, based on the subscription level associated with the user account, etc.

In some embodiments, the information associated with the general and/or originator security levels may be transferred to and stored in the database of the data management system.

Security levels other than described above may also be assigned in additional embodiments. For instance, additional security levels may specify that verification of at least one identity document/material/characteristic associated with an individual who accesses the user account (such as an originator, authorized user, authorized entity, etc.) may be required at particular instances, e.g., immediately after logging into the account and/or prior to selecting particular information to view and/or prior to requesting to modify particular information, etc.

Still referring to FIG. 1, the method 100 further includes associating one or more authorized users with the user account. See operation 116. As used herein, authorized users refer to users (e.g., individuals other than the originator) that may access, manage and modify the user account upon occurrence of a triggering event (e.g., death, legal incapacity of the originator, voluntary decision on the part of the originator, etc.). In some embodiments, the authorized users may correspond to individuals referenced in the originator documents, and particularly those who may gain control of the assets, property and person/health of the user upon occurrence of a triggering condition. Individuals who may gain such control may also be referred to as successors, and include, but are not limited to, trustee(s), executor(s) of a will, DPOA representative(s), health directive representative(s), etc. Authorized user may also be interchangeable referred to as "successors".

In some embodiments, associating authorized users with the user account comprises identifying said authorized users. Accordingly, in one embodiment, the originator may interact with a user interface to identify the authorized users. The user interface may comprise one or more fillable fields in which the identity of authorized users may be input, along with relevant information (e.g., email address(es), home address(es), home telephone number(s), mobile telephone number(s), place of work, etc.) associated with said authorized users.

Figure 5:
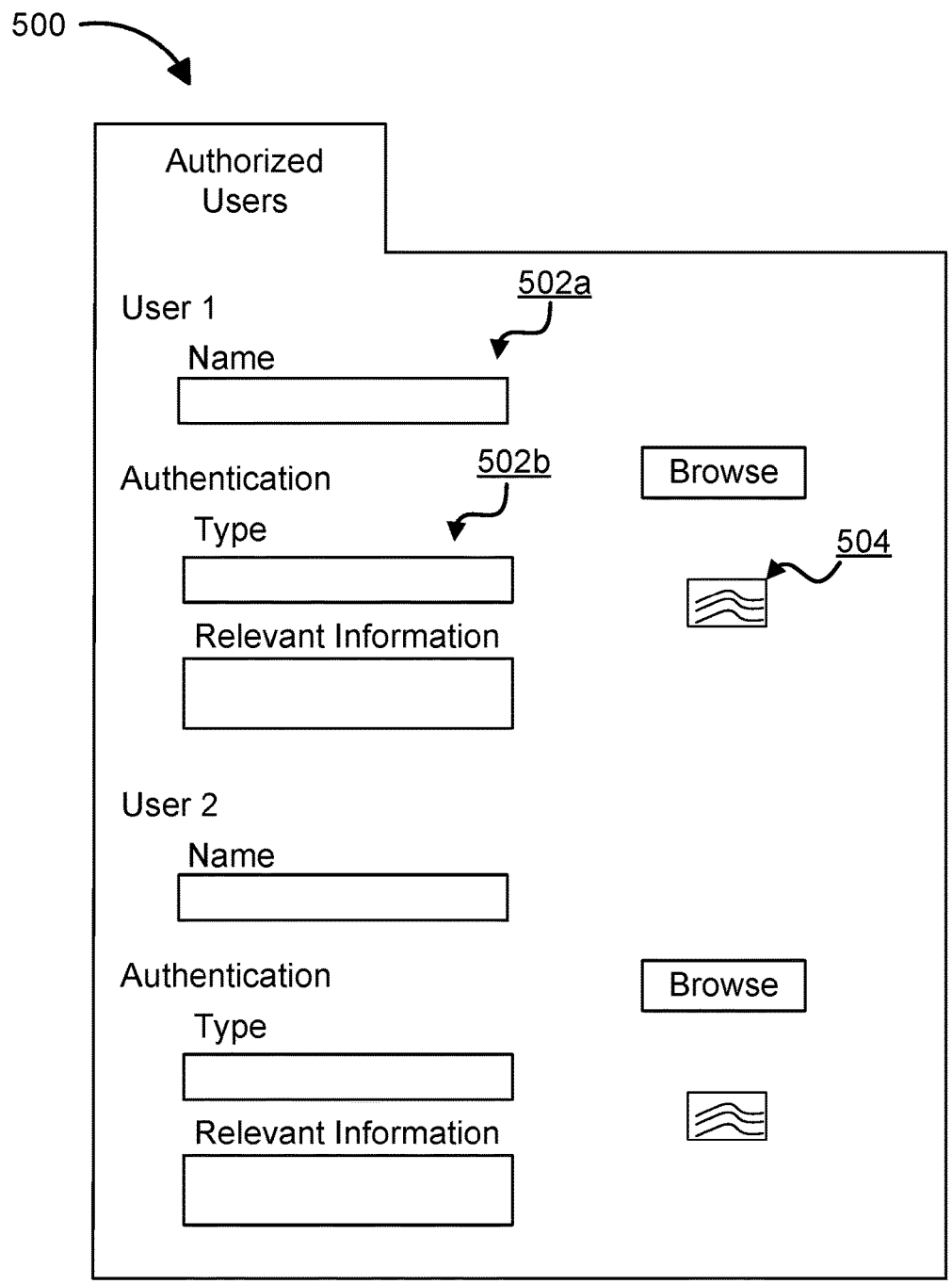
FIG. 5 illustrates a simplified representation of a user interface for facilitating the input/assignment of authorized users, according to one exemplary embodiment.

FIG. 5 illustrates an exemplary embodiment of a user interface 500 for facilitating the selection of authorized users. As shown in FIG. 5, the user interface 500 may graphically display a separate tab or window labeled "Authorized Users," where said tab or window may comprise one or more fillable fields 502a in which the identity of authorized users may be input, along with relevant information associated therewith.

In some embodiments, associating authorized users with the user account further comprises the input of authentication information associated with each authorized user. Suitable authentication information for an authorized user may include the same categories and particular types of authentication information described with reference to originator authentication information. For instance, authentication information for an authorized user may include, but is not limited to: (i) identity documents associated with the authorized user, such as a driver's license, state issue identification (ID), passport, social security card, birth certificate, naturalization papers, etc.; (ii) biometric-based information associated with the authorized user such as ocular characteristics (e.g., retinal vein patterns, iris striations, etc.) which may be determined, e.g., by a retinal scan; facial characteristics (e.g., distance measured between features of an individual's face such interpupillary distance) which may be determined, e.g., by a recognition scan; voice recognition patterns/characteristics, fingerprint(s), palm print, etc.; and (iii) knowledge-based information such as answers (as specified by the authorized user) to predetermined security questions.

For each authorized user, storage of authentication information associated therewith from at least one of the aforementioned categories in the database of the data management system may be required, in some embodiments. For instance, in one such embodiment, storage of one or more identity documents associated with each authorized user in the database may be required. In another such embodiment, storage of one or more biometric-based characteristics associated with each authorized user in the database may be required. In yet another such embodiment, storage of knowledge-based information for each authorized user in the database may be required. In an additional embodiment, for each authorized user, storage of authentication information associated therewith from at least two categories (e.g., categories (i) and (ii); categories (i) and (iii); or categories (ii) and (iii)) in the database may be required. In a further embodiment, for each authorized user, storage of authentication information associated therewith from all three of the aforementioned categories (e.g., categories (i), (ii), and (iii)) in the database may be required.

In some embodiments, the category(ies) of authentication information for an authorized user and/or the type and/or number of authorized user identification materials within said category(ies) may be predetermined (e.g., specified) by the data management system and/or the application associated therewith (e.g., operatively coupled thereto). Accordingly, while not shown in the embodiment of the FIG. 5, the user interface 500 may nonetheless comprise, for each authorized user, designated fields in which specific authentication information may be input. For instance, there may be a fillable field designated with the label "driver's license" in which information depicted within the driver's license of the authorized user may be input.

In some embodiments, there may be no predetermined authentication information fields specified for authorized users in the user interface 500. For instance, as shown in FIG. 5, for each authorized user, one or more fillable fields 502b may be present in which a user may input the identity of a particular type/classification of authentication information, and/or relevant information associated therewith.

In some embodiments, an image or electronic representation of authentication information associated with an authorized user may be stored to the database of the data management system utilizing various processes described herein. For example, in one embodiment, the image or electronic representation of authentication information associated with an authorized user may be locally stored in the memory of the first computing device. Accordingly, said image or electronic representation may be input/uploaded to the database via selection of a "browse" indicator (e.g., a button) that enables said image or electronic representation to be located on the first computing device, and transferred to the data management system for storage in the database thereof. In another embodiment, the image or electronic representation of authentication information associated with an authorized user may be retrieved from a data source associated with a third computing device via a network connection, where the first, second, and third computing device may be operatively coupled with one another, and where the third computing device may be distinct from the first computing device and/or the second computing device associated with the data management system.

In some embodiments, the image or electronic representation of authentication information associated with an authorized user may be classified and analyzed according to the processes described herein (e.g., with respect to the classification and analysis of the originator's driver's license). For instance, in response to receiving an image or electronic representation of an authorized user's driver's license, the image or electronic representation may be classified (e.g., classified as "driver's license"), and analyzed based on said classification. Identifying information from the image or electronic representation of the authorized user's driver's license may be extracted by the application and optionally used to automatically populate relevant fillable fields (if present).

In some embodiments, an image of authentication information associated with an authorized user may be captured by a capturing component (e.g., a camera) of an external device (e.g., a mobile phone, a scanner, a copy machine, etc.) operatively coupled to the first computing device, and subsequently transferred to the first computing device. In some embodiments, the image of authentication information associated with an authorized user may be captured by a capturing component associated with the first computing device (e.g., a camera integrated with the first computing device).

In some embodiments, the image or electronic representation of each authorized user authentication document/material, and information associated therewith, may be transferred to and stored in the database of the data management system. As shown in FIG. 5, a reference 504 (e.g., an icon, label, etc.) to the uploaded images or electronic representations of such documents/materials may be provided on the user interface 500, where selection of the reference 504, e.g. via clicking thereon, may retrieve the respective image or electronic representation of the originator document from the database for display within the user interface 500 or in another window thereof.

It is of note that authentication information associated with authorized users may be referenced in the "Authorized Users" tab shown in FIG. 5. However, in alternative embodiments, the authentication information associated with all authorized user may be referenced in a separate tab labeled "Authorized User Authentication Information."

In some embodiments, the authentication information associated with an authorized user may need to be verified. This verification process may involve approval by the originator and/or a third party. For instance, consider an example where an image or electronic representation of an authorized user's driver's license is stored in the database of the data management system. The authorized user's driver's license may be presented to the originator either in original form or as a copy (e.g., an image or electronic representation thereof). The originator may further access the image or electronic representation of the authorized user's driver's license as stored in the database of the data management system. The originator may then compare the driver license as presented by the authorized user and the image or electronic representation of the authorized user's driver's license as stored in the database. Verification may be achieved where substantially all or a predetermined percentage (e.g., at least 85%, at least 90%, at least 93%, at least 95%, at least 98%, at least 99%, at least 99.99%, or 100%) of the information depicted in the driver license as presented by the authorized user matches the information depicted in the image or electronic representation of the authorized user's driver's license as stored in the database. The verification process may also involve a comparison of the image or electronic representation of the authorized user's license plate as stored in the database to one or more characteristics associated with the authorized user. For instance, such a comparison may involve comparison of the photograph of the authorized user depicted in his/her driver's license to the physical characteristics of the authorized user to determine any similarities therebetween.

In response to a successful verification, an indicator indicating that a valid verification occurred may be selected. Such an indicator may represent a button labeled "Verified" or "Verification Approved" or the like. Selection of said indicator may further require the input of information related to the verification process, such as an identity of the individual or entity that performed the verification process, the steps taken during said verification process, and/or a timestamp corresponding to when said verification process occurred.

In some embodiments, after images or electronic representations of authentication information associated with an authorized user are input/uploaded to the database, and/or relevant information from said images or electronic representation is provided in fillable fields (if present), and/or a successful verification process as described above was implemented, an indicator labeled "Complete," "Finish," or the like may be selected. In response to the selection of such an indicator, the images or electronic representation of authentication information associated with an authorized user and the relevant information associated therewith may not be modified or added thereto until the originator (or authorized user/entity as described infra) indicates otherwise (e.g., by selecting an indicator labeled "edit," "modify" or the like). In further embodiments, selection of an "edit" indicator to modify the images or electronic representation of authentication information associated with an authorized user and the relevant information associated therewith may require additional operations prior to allowing the desired modification to proceed, where such additional operations may include verification of authentication information associated with the originator (or authorized user/entity) as described in detail infra.

For example, when the user account is assigned a "RED" status, an authorized user may be not be permitted access to the user account, or even if the authorized user(s) is allowed such access and is permitted to view particular information, the authorized user may be prevented from modifying any information associated with said account, including information associated with originator documents, originator authentication data, and authentication data associated with the authorized user. Moreover, even when the user account is assigned a "GREEN" status such that the authorized user is permitted access to the user account and is permitted to modify particular information associated with the user account (such as particular originator documents), such modification may only occur upon verification of identity documents/materials of the authorized user(s), where said verification may be based at least in part on a comparison process in which the identity documents/materials of the authorized user(s) are compared to corresponding authorized user authentication information stored in the database.

In some embodiments, each authorized user is associated with one or more originator documents that said authorized user is permitted to modify and/or act according to the instructions specified therein, provided the user account is assigned a "GREEN" status and certain (optional) verification procedures are satisfied. In some embodiments, the association between each authorized user and one or more originator documents may be referenced, e.g., in the "Authorized User" tab described in FIG. 5.

In some embodiments, the association between each authorized user and one or more originator documents may be based on user input and/or on analysis of relevant information provided in the originator document(s). For instance, a first authorized user may be designated as a trustee in a trust document corresponding to the originator. The originator may interact with a user interface (e.g., the user interface 500 described in FIG. 5) to note/specify the association between the first authorized user and the trust document (originator document). Alternatively, the association between the first authorized user and the trust document may be automatically determined, e.g., by the data management system and/or the application associated therewith (e.g., operatively coupled thereto) via analysis of extracted information from the image or electronic representation of the trust document, which may be stored in the database of the document management system. When the user account is assigned a "GREEN" status and certain (optional) verification procedures are satisfied, the authorized user may then be able to access, view, modify, etc. the information associated with the trust stored in the database, and otherwise control the assets and property described in the trust according to the instructions therein.

It is important to note that each authorized user may be associated with a particular subset of originator documents. For instance, with reference to the example discussed directly above, the first authorized user, while associated with the trust document, may not be associated with other originator documents such as medical records, wills, real estate documents, etc. Accordingly, when the user account status is assigned a "GREEN status" and certain (optional) verification procedures are satisfied, the authorized user may have permission to access the Trusts tab (e.g., 402*b* in FIG. 4) and certain information related thereto, but be prevented from accessing the Wills tab (e.g., 402*c* in FIG. 4), the Medical Records tab (e.g., 402*d* in FIG. 4); the Real Estate tab (e.g., 402*f* in FIG. 4), etc. As such, at least the Wills, Medical Records and Real Estate tabs may be "greyed out," overlaid with a pattern (e.g., a stippling pattern, series of lines, etc.) or otherwise modified to indicate that said information is inaccessible. In an alternative embodiment, the Wills, Medical Records and Real Estate tabs may not be viewable by the first authorized user at all (e.g., said tabs may effectively be invisible to the first authorized user). Such embodiments prevent the first authorized user from being exposed to personal information of the originator that he/she is not authorized to access, thereby avoiding possible violations of the originator's privacy rights.

Moreover, while the first authorized user is associated with one particular trust document, said user may not be associated with other trust related documents listed in the aforementioned Trusts tab (e.g., 402*b* in FIG. 4). The first authorized user may therefore not be able to view, access, modify, etc. the information within the Trusts tab that is not associated with the first authorized user. Such information within the Trusts tab that is not associated with the first authorized user may also be "greyed out," overlaid with a pattern (e.g., a stippling pattern, series of lines, etc.), invisible, or otherwise modified to indicate that said information is inaccessible.

It is important to note that each authorized user may be associated with one, two or more, a plurality, a majority, or all of the originator documents. In some embodiments, each authorized user may also be associated with originator documents classified in different categories (e.g., trusts and real-estate). In some embodiments, at least two authorized users may be associated with different originator document(s) from one another. In some embodiments, at least two authorized users may be associated with one or more of the same originator documents.

In some embodiment in which only one authorized user is designated by the originator, the originator may indicate that the sole authorized user has access to all information (e.g., to all originator documents) associated with the originator's account. Such indication may require selection of an indicator, e.g., a button labeled as "access all"), when information regarding the sole authorized user in input and stored in the database of the data management system.

While also not shown in FIG. 1, the method 100 may optionally include assigning a security level associated with each authorized user's access to information stored in the database of the data management system. As used herein, security levels affecting an authorized user's access and/or activities with respect to the user account may be referred to as "authorized user security levels." Each authorized user may be assigned unique security levels, in some embodiments.

In some embodiments, an authorized user security level may be associated with an authorized user's ability to access originator document information input into Tillable field(s) of a user interface associated with the application executed on a computing device, and stored in the database of the data management system. Access to the originator document information may comprise viewing, modifying, etc. existing originator document information. The authorized user security level may identify the number and type of authorized user authentication information (e.g., identity documents, biometric information, and knowledge-based information) that need to be verified prior to accessing said originator documents, as well as a time period during which said originator documents may be accessed by the authorized user.

For example, to access the originator document information, the authorized user security level may first require the user account to be assigned a "GREEN status." The authorized user security level may also require verification of at least one identity document associated with the authorized user (e.g., the authorized user's driver's license), where such verification comprises comparing a received image or electronic representation of the identity document to the existing image or electronic representation of the identity document stored in the database of the data management system. Consider one such illustrative embodiment in which the user account is assigned a "GREEN status," and the authorized user wishes to view and/or modify existing originator document information to which the authorized user is associated (as described previously), and where the authorized user security level for such access requires verification of the authorized user's driver's license. Accordingly, to gain such access, the authorized user, after logging into the user account, may input/upload an image of the authorized user's driver's license. The received image or electronic representation of the authorized user's driver's license may be classified and analyzed using the techniques described herein, and the information extracted therefrom may be compared to the existing information associated with the authorized user's driver's license that is already stored in the database of the data management system. In some embodiments, the comparing may be achieved by the data management system and/or the application associated therewith (e.g., operatively coupled thereto), or a third party computing device distinct from the first computing device.

In another embodiment, the verification process may alternatively, or additionally, involve approval by a third party (e.g., a lawyer or other such individual). For instance, returning to the example above, to gain access to the originator document information, the authorized user's driver's license may be presented to the third party either in original form or as a copy (e.g., an image or electronic representation thereof). The image or electronic representation of the authorized user's driver's license as stored in the database of the data management system may also be accessed and displayed on a graphical user interface. The third party may then compare the driver license as presented by the authorized user and the image or electronic representation of the authorized user's driver's license as stored in the database. In response to a determination that substantially all or a predetermined percentage (e.g., at least 85%, at least 90%, at least 93%, at least 95%, at least 98%, at least 99%, at least 99.99%, or 100%) of the information depicted in the driver license as presented by the authorized user matches the information depicted in the image or electronic representation of the authorized user's driver's license as stored in the database, an indicator indicating that a valid verification occurred may be selected. Such an indicator may represent a button labeled "Verified" or "Verification Approved" or the like. Selection of said indicator may further require the input of identifying information associated with the third party (e.g., an electronic signature, name, address, telephone number, license number, social security number, an image or electronic representation of an identity document associated with the third party) and/or a timestamp associated with said verification so as to provide a record as to who verified the identification information of the authorized user and when said verification occurred.

It is important to note that the authorized user security level may require the verification of any authorized user identity document described herein, any authorized user biometric characteristic described herein, any authorized user knowledge based authentication information described herein (e.g., the provision of answers to predetermined security questions), and combinations thereof.

In some embodiments, authorized user security levels associated with each authorized user's access rights may be specified by the originator. In other embodiments, authorized user security levels may be specified by the data management system and/or the application associated therewith according to a default setting, based on the subscription level associated with the user account, etc.

In some embodiments, the information associated with the authorized user security levels may be transferred to and stored in the database of the data management system.

With continued reference to FIG. 1, the method 100 further includes associating one or more authorized entities with the user account. See operation 118. As used herein, authorized entities may refer to entities or individuals acting in a representative capacity for said entities that may access, manage and modify the user account upon occurrence of a triggering event (e.g., death or legal incapacity of the originator). In some embodiments, the authorized entities may be those referenced in the originator documents. Authorized entities may include, but are not limited to, financial institutions (e.g., banks, mortgage brokers, credit card companies, credit reporting companies, etc.), insurance companies, title companies, medical institutions (e.g., private and public hospitals, particular doctor's offices/practices, etc.), government entities, etc.

In some embodiments, associating authorized entities with the user account comprises identifying said authorized entities. Accordingly, in one embodiment, the originator may interact with a user interface to identify the authorized entities. The user interface may comprise one or more fillable fields in which the identity of authorized entities may be input, along with relevant information (e.g., address, telephone number, fax number, names of individuals acting in a representative capacity or as said agent of said entities, etc.) associated with said authorized entities.

Figure 6:
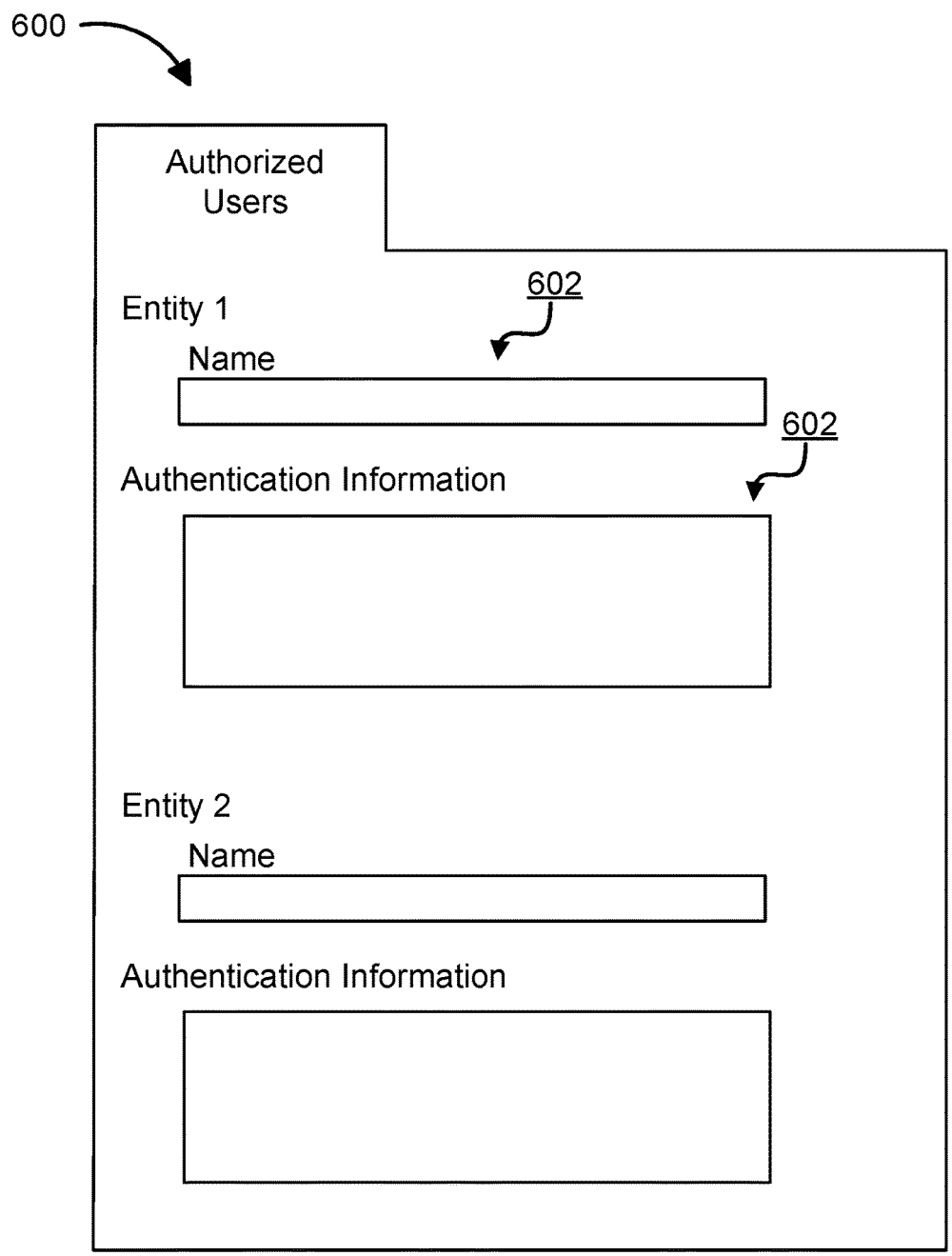
FIG. 6 illustrates a simplified representation of a user interface for facilitating the input/assignment of authorized entities, according to one exemplary embodiment.

FIG. 6 illustrates an exemplary embodiment of a user interface 600 for facilitating the input of authorized entities. As shown in FIG. 6, the user interface 600 may graphically display a separate tab or window labeled "Authorized Entities" where said tab or window may comprise one or more fillable fields 602 in which the identity of authorized users may be input, along with relevant information associated therewith. In some embodiments, the identities of the authorized entities may be displayed in the "Authorized Users" tab (see, e.g., FIG. 5) rather than in a separate "Authorized Entities" tab.

In some embodiments, each authorized entity is associated with one or more originator documents that said authorized entity is permitted to modify and/or act according to the instructions specified therein, provided the user account is assigned a "GREEN" status and certain (optional) verification procedures are satisfied. In some embodiments, the association between each authorized entity and one or more originator documents may be referenced, e.g., in the "Authorized Entity" tab illustrated in FIG. 6.

Further, in some embodiments, the association between each authorized entity and one or more originator documents may be based on user input and/or on analysis of relevant information provided in the originator document(s). For instance, a particular insurance company (authorized entity) may be the provider of an insurance policy corresponding to the originator. The originator may interact with a user interface (e.g., the user interface 600 described in FIG. 6) to note/specify the association between the insurance company and the insurance policy (originator document). Alternatively, the association between the insurance company and the insurance policy may be automatically determined, e.g., by the data management system and/or the application associated therewith (e.g., operatively coupled thereto), via analysis of extracted information from the image or electronic representation of the insurance policy, which may be stored in the database of the document management system. When the user account is assigned a "GREEN" status and certain (optional) verification procedures are satisfied, the authorized entity may be able access, view, modify, etc. the information associated with the insurance policy stored in the database.

It is important to note that each authorized entity may be associated with a particular subset of originator documents. For instance, with reference to the example discussed directly above, the insurance company, while associated with the insurance policy, may not be associated with other originator documents such as medical records, wills, real estate documents, etc. Accordingly, when the user account status is assigned a "GREEN status" and certain (optional) verification procedures are satisfied, the insurance company (the authorized entity) may have permission to access the Insurance Policies tab (e.g., 402e in FIG. 4) and certain information related thereto, but be prevented from accessing the Wills tab (e.g., 402c in FIG. 4), the Medical Records tab (e.g., 402d in FIG. 4); the Real Estate tab (e.g., 402f in FIG. 4), etc. As such, at least the Wills, Medical Records and Real Estate tabs may be "greyed out," overlaid with a pattern (e.g., a stippling pattern, series of lines, etc.) or otherwise modified to indicate that said information is inaccessible. In an alternative embodiment, the Wills, Medical Records and Real Estate tabs may not be viewable by the authorized entity at all (e.g., said tabs may effectively be invisible to the authorized entity). Such embodiments prevent the authorized entities from being exposed to personal information of the originator that they are not authorized to access, thereby avoiding possible violations of the originator's privacy rights. For instance, a bank need not see the medical records of the originator (a possible HIPA violation), and a hospital need not know how much property the originator owns.

Moreover, while the aforementioned insurance company (authorized entity) may be associated with one particular insurance policy such as a car insurance policy, said insurance company may not be associated with other insurance related documents (e.g., a health insurance policy) listed in the aforementioned Insurance Policies tab (e.g., 402e in FIG. 4). The insurance company may therefore not be able to view, access, modify, etc. the information within the Insurance Policies tab that is not associated with the car insurance policy. Such information within the Insurance Policies tab that is not associated with the car insurance police may also be "greyed out," overlaid with a pattern (e.g., a stippling pattern, series of lines, etc.), invisible, or otherwise modified to indicate that said information is inaccessible.

It is important to note that each authorized entity may be associated with one, two or more, a plurality, a majority, or all of the originator documents. In some embodiments, each authorized entity may also be associated with originator documents classified in different categories (e.g., trusts vs real-estate). In some embodiments, at least two authorized entities may be associated with different originator document(s) from one another. In some embodiments, at least two authorized entities may be associated with one or more of the same originator documents In some embodiments, banking entities (such as a bank, lender, mortgage broker, etc.) may also have access to a Credit Reporting tab (not shown in FIG. 4), which may include information as to FICO credit scores, credit history, etc. of the originator, and/or a means (e.g., a link to a credit reporting company) to instantly access said information.

With continued reference to FIG. 1, the method 100 includes assigning the user account a "RED" status. See operation 120. In some embodiments, the "RED" status may indicate that only the originator may log into the user account and access the information associated therewith. In some embodiments, the "RED" status may indicate that only the originator may modify the information associated with the user account. In the latter described embodiments, the account number of the user account may be provided/communicated to the authorized users and entities, and the authorized users and entities may be able to access the user account. Further, in the latter described embodiments, the authorized users and entities may optionally view (but not modify) particular information to which the authorized users or entities are assigned.

In some embodiment, authorized entities may be able to modify existing information associated with the originator's user account and/or add new information thereto even when the user account is assigned a "RED" status provided such modification or addition is approved by the originator. For instance, the originator, during the timer period in which his/her user account is assigned a "RED" status, may wish to update an existing insurance policy or create a new insurance policy. The originator may provide the updated or new insurance policy to the database of the data management system themselves, provided certain verification procedures are satisfied as disclosed herein.

Alternatively, the insurance company associated with insurance policy may provide the updated or new insurance policy to the data management system on behalf of the originator. Such an instance may occur, for example, when the originator updates the insurance policy or creates a new insurance policy at a place of business of said insurance company. This transaction may require verification of the identity of the originator according to the methods discloses herein, and be associated with the account number of the originator's account. For instance, the updated or new insurance policy may be associated with the account number of the originator's account, and provided to the databased of the data management system for storage therein. As updated or new insurance policy is associated with the account number of the originator's user account, said information may automatically become part of the originator's user account (e.g., said information is accessible from the originator's user account), thereby ensuring that the insurance information associated with the originator is current. It is important to note that this embodiment extends to transaction involved any type of originator documents (e.g., wills, real estate transactions, health/medical updates, etc.) such that the information associated with the originator's documents remains current and up-to-date.

The account number may be automatically provided/communicated to the authorized users and entities upon the user account's change from "RED" to "GREEN" status. Alternatively, the account number may be provided/communicated to the authorized user and entities at any time specified by the originator.

In some embodiments, one or more triggering conditions may be defined which trigger/prompt assignment of a "GREEN" status to the user account. In some embodiments, the "GREEN" status may indicate that authorized users and entities may access (e.g., log into) the user account and modify and/or act in accordance to certain information associated therewith (e.g., the information to which the authorized users and entities are associated with). For instance, an authorized user may correspond to an designated executor of the originator's will, and may thus access, modify, view, etc. the will and otherwise perform functions/make decisions in accordance with the will when the user account status is assigned "GREEN" status. The triggering conditions that may trigger/prompt "GREEN" status may include receipt of information regarding the death of the originator, the legal incapacity of the originator, a voluntary decision by the originator as to a transition to "GREEN" status, etc. Such information may be provided, e.g., in a medical document, a legal document, a signed statement by the originator, a verbal statement by the originator when paired with at least one other indication of the wishes and/or mental/health capacity of the originator, a unanimous (and recorded) decision from certain successors (such as the spouse and/or children of the originator), in a provision of an originator document, etc.

In some embodiments, the triggering condition(s) may be specifically set forth in one or more originator documents. For example an originator document, such as a trust, may specify a particular date on which the user account may transition to "GREEN" status thereby enabling the successor(s) associated therewith to act in accordance with the terms set for the in the trust. An originator document may also address instances in which the originator is incapacitated (e.g., is in a coma, mentally unfit, etc.) and specify the requirements for transitioning the user account to "GREEN" status. For instance, an originator document (e.g., a will, trust document, etc.) may specific that if the originator is in a coma or otherwise unable to make decisions on his/her behalf, a doctor's note affirming the originator's condition or a unanimous decision by the spouse and/or children of the originator or a legal document affirming the incapacity of the originator is required to transition the originator's user account to "GREEN" status.

In some embodiment, a predetermined number (e.g., 1, at least 2, at least 3, at least 4, etc.) of triggering conditions must occur prior to the transition of the user account to "GREEN" status. In one embodiment, this predetermined number of triggering conditions may be specified by the originator. The originator may interact with a user interface of the application to specify the type and/or predetermined number of required triggering conditions. The type and/or predetermined number of triggering conditions may alternative, or additionally, be specified in one or more originator documents. In another embodiment, the type and/or predetermined number of required triggering conditions may be specified by the data management system and/or the application associated therewith.

Another triggering condition may relate to an event verified by a doctor or appropriate health official. For instance, consider an example where the originator goes to the hospital for as a result of illness, injury, coma, etc. An authorize user associated with health documents of the originator (e.g., a directive specifying that the authorized user is able to make health/medical decision on behalf of the originator if one or more triggering conditions occurs) may be contacted by hospital. The hospital may find information as to the authorized user and the originator documents with which said user is associated with by accessing the database of the data management service (and, e.g., by searching the Medical Records tab 402d of FIG. 4). A doctor or other health official attending the originator may upload, to the database, a letter of incapacitation, death certificate, etc. when appropriate, or a signed authorization form originator to initiate transition (if deemed mentally capable by doctor) to "GREEN" status. The identity of the successor may be verified, e.g., by hospital, according to the methods disclosed herein, t and the originator's user account may transition to "GREEN" status. Authorized user may then be able to work in the interests of the originator in accordance with the originator documents to which the authorized users are associated. In such example, the authorized users do not need to do anything else to initiate transition, as the it has all been done at the hospital.

In some embodiments, one or more triggering conditions may be defined which trigger/prompt assignment of a "YELLOW" status to the user account. In some embodiments, the "YELLOW" status may indicate that one or more identifying documents/materials/characteristics of an originator, an authorized user or an authorized entity need to be verified prior to allowing the originator, authorized user or authorized entity access to the user account and/or access to the information associated therewith. When assigned a "YELLOW" status, the user account is effectively on hold or "frozen" until the required identifying documents/materials/characteristics are verified In some embodiments, the triggering condition(s) for prompting transition to "GREEN" or "YELLOW" status may be stored in the database of the data management system.

Transition

Figure 7:
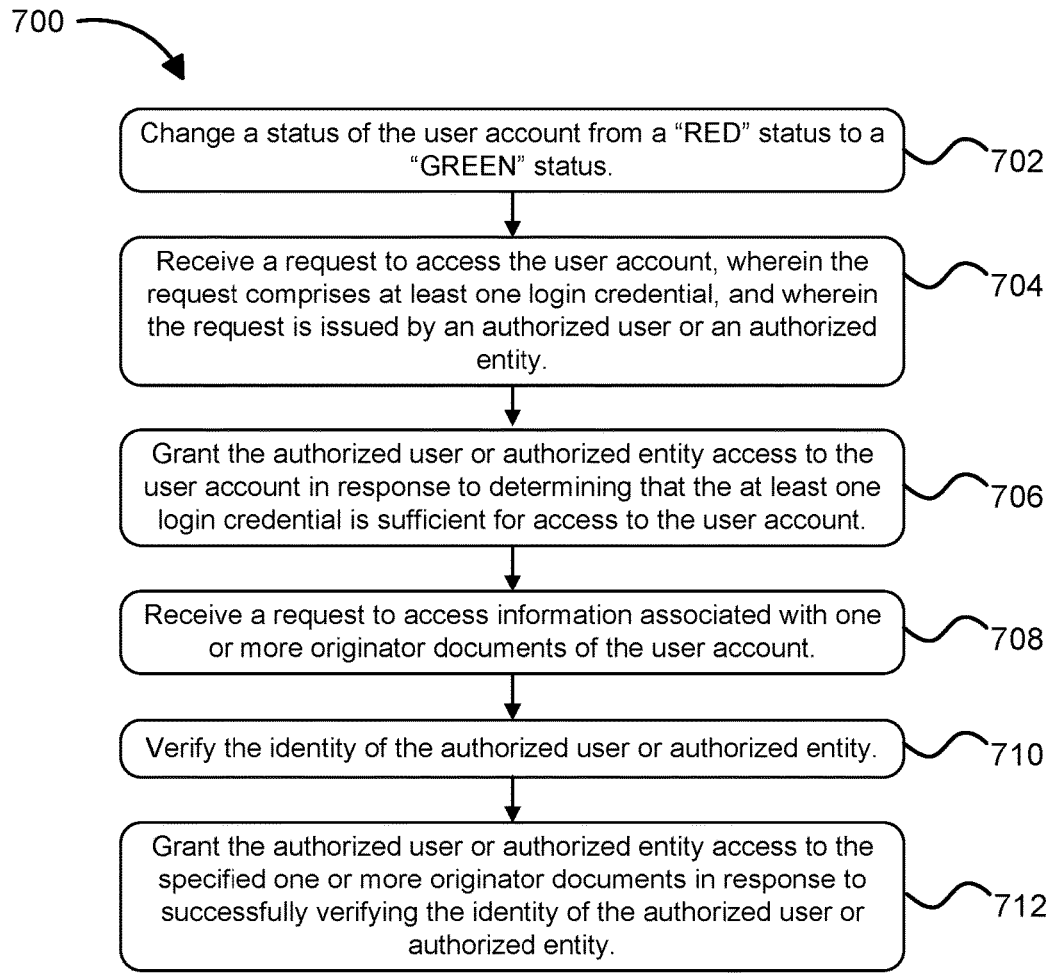
FIG. 7 illustrates a flowchart of a method for changing the status of a user account, according to one exemplary embodiment, where said status defines user access rights to the account and information associated therewith.

Referring now to FIG. 7, a flowchart of a method 700 for changing the status of a user account (such as described in FIG. 1), where said status defines user access rights to the account and information associated therewith, is shown according to one exemplary embodiment. The method 700 may include more or less operations than those described and/or illustrated in FIG. 7. Moreover, the order of operations described and/or illustrated in FIG. 7 is not limiting, and may be varied as would be appreciated by skilled artisans upon reading the present disclosure. Further, any of the features and operations described and/or illustrated in FIG. 7 may be used in any of the embodiments described herein, such as those described and/or illustrated in the other FIGS.

It is of note that method 700 represents a variation or continuation of the method 100 of FIG. 1, and thus may share common terms, numbering, and concepts therewith.

As shown in FIG. 7, the method 700 includes changing the status of the user account from "RED" to "GREEN" in response to one or more triggering conditions. See operation 702. As discussed previously, the "GREEN" status may indicate that authorized users and entities associated with the user account may access (e.g., log into) the user account and modify and/or act in accordance to certain information associated therewith (e.g., the information to which the authorized users and entities are associated with). As also discussed previously, the one or more triggering conditions may include receipt of information regarding the death or legal incapacity of the originator, a voluntary decision by the originator as to a transition to "GREEN" status, etc. In some embodiments, such information regarding the originator's current state of being or wishes may be described in one or more originator documents themselves, a medical notice (e.g., a doctor's note), an obituary notice, a legal document (e.g., a court document affirming the legal incapacity of the originator), a written declaration/oath or statement by the originator (provided the originator is judged to be legally incapacitated), etc. Accordingly, in some embodiments, receipt of the information regarding the originator's current state of being or wishes may comprise receipt of an image or electronic representation of the aforementioned documents (e.g., medical notice, obituary notice, legal document, written declaration/oath or statement by originator, voice and/or video recording of the originator expressing his/her wishes, etc.). The image or electronic representation may be classified and analyzed according to the processes described herein, and relevant information from the image or electronic representation may be extracted. In some embodiments, this extracted information may be provided to the data management system for storage in the database thereof.

In operation 704, a request to access the user account is received, where the request comprises at least one login credential, and where the request is issued by an authorized user or authorized entity. The at least one login credential may comprise one or more of the login credentials described herein. In one embodiment, the login credential comprises the account number associated with the account.

In operation 706, access to the user account is granted to the authorized user or authorized entity in response to determining that the at least one login credential is sufficient for access to the user account.

In operation 708, a request to access information associated with one or more originator documents of the user account is received, where the request is issued by the authorized user or authorized entity. In some embodiments, the request to access information associated with the one or more originator documents comprises a request to modify, view, update, delete, etc. at least a portion of the information associated with the one or more originator documents.

In operation 710, the identity of the authorized user of authorized entity is verified. Such verification may comprise first receiving at least one identifying document, material or characteristic of the authorized user or the authorized entity. In some embodiments, the at least one identifying document, material or characteristic may be received as an image or electronic representation of the original identifying document, material or characteristic.

In some embodiment, the verification process may further comprising comparing the received identifying document, material or characteristic of the authorized user or authorized entity to the corresponding identifying document, material or characteristic of said authorized user or authorized entity stored in the data management system, particularly the database thereof. The identity of the authorized user or authorized entity may be verified where substantially all or a predetermined percentage (e.g., at least 85%, at least 90%, at least 93%, at least 95%, at least 98%, at least 99%, at least 99.99%, or 100%) of the information depicted in the received identifying document, material or characteristic of said authorized user or authorized entity matches the information depicted in the corresponding identifying document, material or characteristic of said authorized user or authorized entity stored in the database of the data management system.

In operation 712, access to the specified originator document(s) is granted in response to successfully verifying the identity of the authorized user or authorized entity.

While not shown in FIG. 7, prior to implementation or completion of operation 712, the method 700 may comprises determining whether the authorized user or authorized entity is associated with the specified originator document(s) and/or has permission to access said originator document(s).

Security Measures

Figure 8:
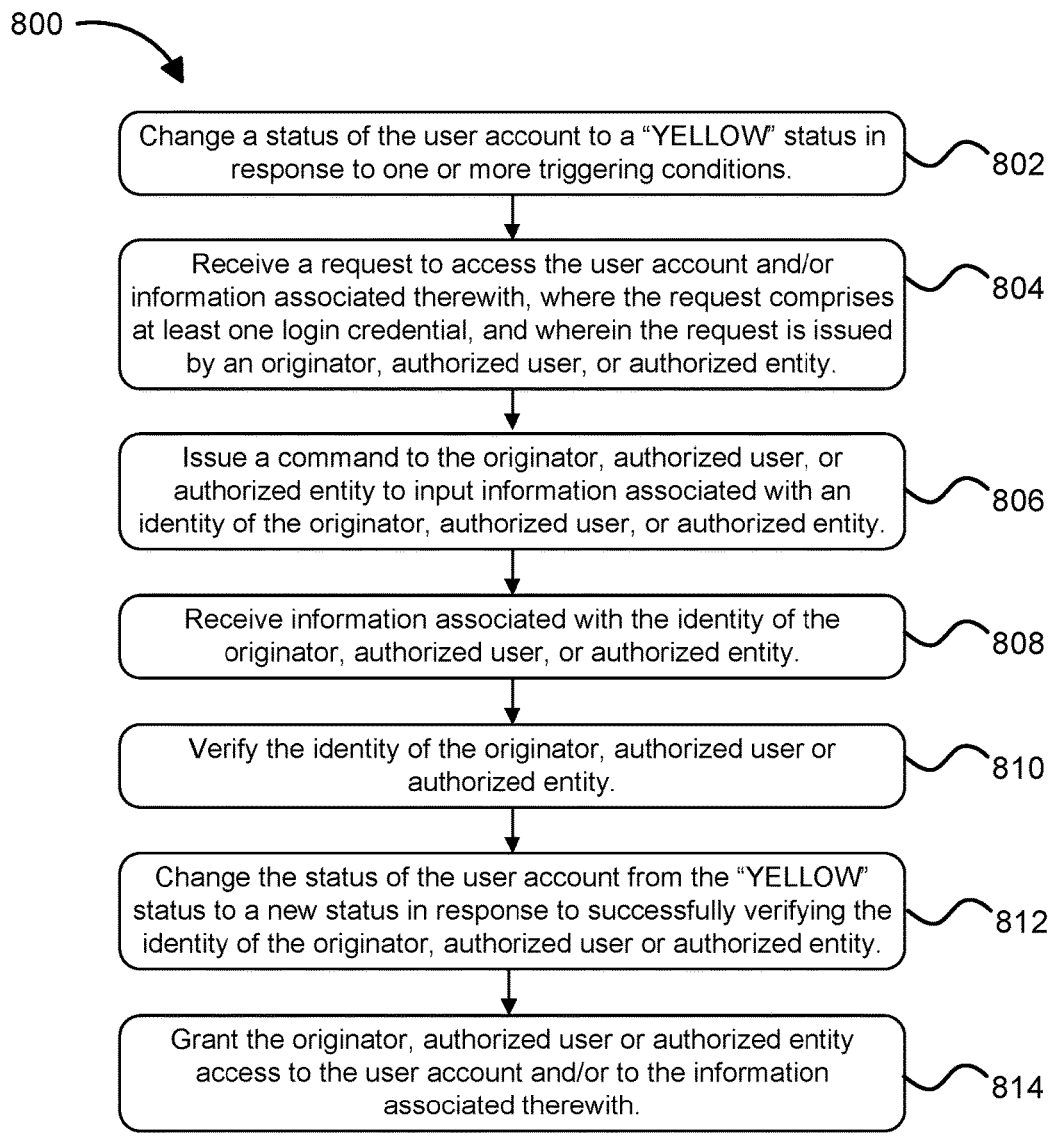
FIG. 8 illustrates a flowchart of a method for changing the status of a user account, according to another exemplary embodiment, where said status defines user access rights to the account and information associated therewith, according to one exemplary embodiment.

Referring now to FIG. 8, a flowchart of a method 800 for changing the status of a user account (such as described in FIG. 1), where said status defines user access rights to the account and information associated therewith, is shown according to another exemplary embodiment. The method 800 may include more or less operations than those described and/or illustrated in FIG. 8. Moreover, the order of operations described and/or illustrated in FIG. 8 is not limiting, and may be varied as would be appreciated by skilled artisans upon reading the present disclosure. Further, any of the features and operations described and/or illustrated in FIG. 8 may be used in any of the embodiments described herein, such as those described and/or illustrated in the other FIGS.

It is of note that method 800 represents a variation or continuation of the method 100 of FIG. 1 and/or method 700 of FIG. 8, and thus may share common terms, numbering, and concepts therewith.

As shown in FIG. 8, the method 800 includes changing the status of the user account to "YELLOW" in response to one or more triggering conditions. See operation 802. As discussed previously, the "YELLOW" status may indicate that one or more identifying documents/materials/characteristics of an originator, an authorized user or an authorized entity need to be verified prior to allowing the originator, authorized user or authorized entity access to the user account and/or access to the information associated therewith. When assigned a "YELLOW" status, the user account is effectively on hold or "frozen" until the required identifying documents/materials/characteristics are verified.

In some embodiments, the status of the user account may be changed from "GREEN" to "YELLOW" or from "RED" to "YELLOW."

In some embodiments, the triggering condition(s) sufficient and/or necessary for changing the status of the user to the "YELLOW" status may include occurrence of login attempts (attempts to access the user account) that exceed a predetermined threshold. In some embodiments, the triggering condition(s) may include tampering with the user account, such as an unauthorized access/login to the user account. In some embodiments, the triggering condition(s) may include determination of an error associated with information related to one or more originator documents, authentication information associated with the originator and/or the authorized users and authorized entities, etc. For instance, in one such embodiment, it may be determined that the information of an originator identity document input by the user into a user interface of the application does not correspond to information extracted, e.g., by the application, from an image or electronic representation of the originator identity document stored in the database. In another such embodiment, it may be determined that an image quality of a stored originator documents, user identity document, and/or an authorized user identity document has degraded and/or does not satisfy a predetermined quality threshold.

In operation 804, a request to access the user account and/or information associated therewith is received, where the request comprises at least one login credential, and where the request is issued by an originator, authorized user or authorized entity. The at least one login credential may comprise one or more of the login credentials described herein. In one embodiment, the login credential comprises the account number associated with the account.

In operation 806, a command is issued to the originator, authorized user or authorized entity to provide information associated with an identity of the originator, authorized user or authorized entity.

In operation 808, information associated with the identity of the originator, authorized user or authorized entity is received. In some embodiments, the information may be received as an image or electronic representation of an identity document, material or characteristic associated with the originator, authorized user or authorized entity.

In operation 810, the identity of the originator, authorized user of authorized entity is verified. Such verification may comprise comparing the received information associated with the identity of the originator, authorized user or authorized entity with corresponding identity information stored in the data management system, particularly the database thereof. Successful verification may occur where substantially all or a predetermined percentage (e.g., at least 85%, at least 90%, at least 93%, at least 95%, at least 98%, at least 99%, at least 99.99%, or 100%) of the received identity information of the originator, authorized use or authorized entity matches the corresponding identity information of said authorized user or authorized entity stored in the database of the data management system.

In response to successfully verifying the identity of the originator, authorized user or authorized entity, the "YELLOW" status of the user account is removed, and a new status may be assigned. See operation 812. In some embodiments, the status may be changed from "YELLOW" to "RED," or from "YELLOW" to "GREEN."

In operation 814, the originator, authorized user or authorized entity is allowed access to the user account and/or the information associated therewith. In some embodiments, the originator, authorized user or authorized entity is allowed access to the user account and/or the information associated therewith depending on the status to which the user account was changed (e.g., from "YELLOW"). For instance, in embodiments in which the status is changed from "YELLOW" to "RED," a user, but not the authorized users or entities, may be permitted to access the user account and/or the information associated therewith. In embodiments in which the status is changed from "YELLOW" to "GREEN," the authorized users or entities may be permitted to access the user account and/or the information associated therewith.

As discussed herein, various functionalities may be implemented using one or more computing systems. Exemplary computer system architectures are presented in U.S. Provisional Patent Application Ser. No. 62/241,062, which is herein incorporated by reference in its entirety.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention.

As will be appreciated by skilled artisans, aspects of the present invention may be embodied as a system, method or computer program product. Aspects of the present invention may therefore take the form of an entirely hardware embodiment, an entirely software embodiment (including firmware, resident software, micro-code, etc.) or an embodiment combining software and hardware aspects. Aspects of the present invention may take the form of a computer program product comprising one or more non-transitory computer readable medium(s), where each non-transitory computer readable medium has computer readable program code (computer readable instructions) embodied thereon.

A non-transitory computer readable medium is a medium configured to contain, or store a program, application, or computer readable program code/instruction executable by or for use in connection with an instruction execution system, apparatus, or device. A non-transitory computer readable medium may include, but is not limited to: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, combinations thereof, etc. or other electronic, magnetic, optical, electromagnetic, infrared, or semiconductor system, apparatus, or device as would be appreciated by skilled artisans.

Computer readable program code/instructions embodied on a non-transitory computer readable medium may be transmitted using wireless, wired, optical fibre cable, RF, combinations thereof or any other suitable medium as known in the art. Computer readable program code/instructions may also be loaded onto a computing device, a programmable data processing apparatus, or other devices to cause a series of operations (e.g., operating and functions specified in the FIGS. herein) to be performed by/executed on the computing device, programmable data apparatus or other such devices.

Computer readable program code/instructions may be written in any combination of one or more known programming languages (e.g., object oriented programming language such as Java, Smalltalk, C++, etc., and procedural programming languages such as "C" programming language and the like). Computer readable program code/instructions may execute as a stand-alone software package, on a user's computing device, a remote computing device or server, in part on a user's computing device and in part on a remote computing device or server, etc. In embodiments where the computer readable program code/instructions may execute on both a user's computing device and a remote computing device or server, said computing devices may be operatively coupled via a network (e.g., a local area network (LAN), a wide area network (WAN), or via the Internet).

As indicated above, various embodiments of the present invention disclosed herein may use any known communicating means to communicate among a plurality of computing systems. Such computing means may include, but is not limited to, the Internet, a private intranet, a LAN, a WAN, a Virtual Local Area Network (VLAN), or via other such suitable network connection. Various combinations of wired, wireless (e.g., radio frequency), and optical communication links may also be used for communication purposes.

The program environment in which embodiment of the inventions may be executed may incorporate one or more general-purpose computers or special-purpose devices such hand-held computers. Details of such devices (e.g., processor, memory, data storage, input and output devices) are known in the art and are omitted for the sake of clarity.

Figure 9:
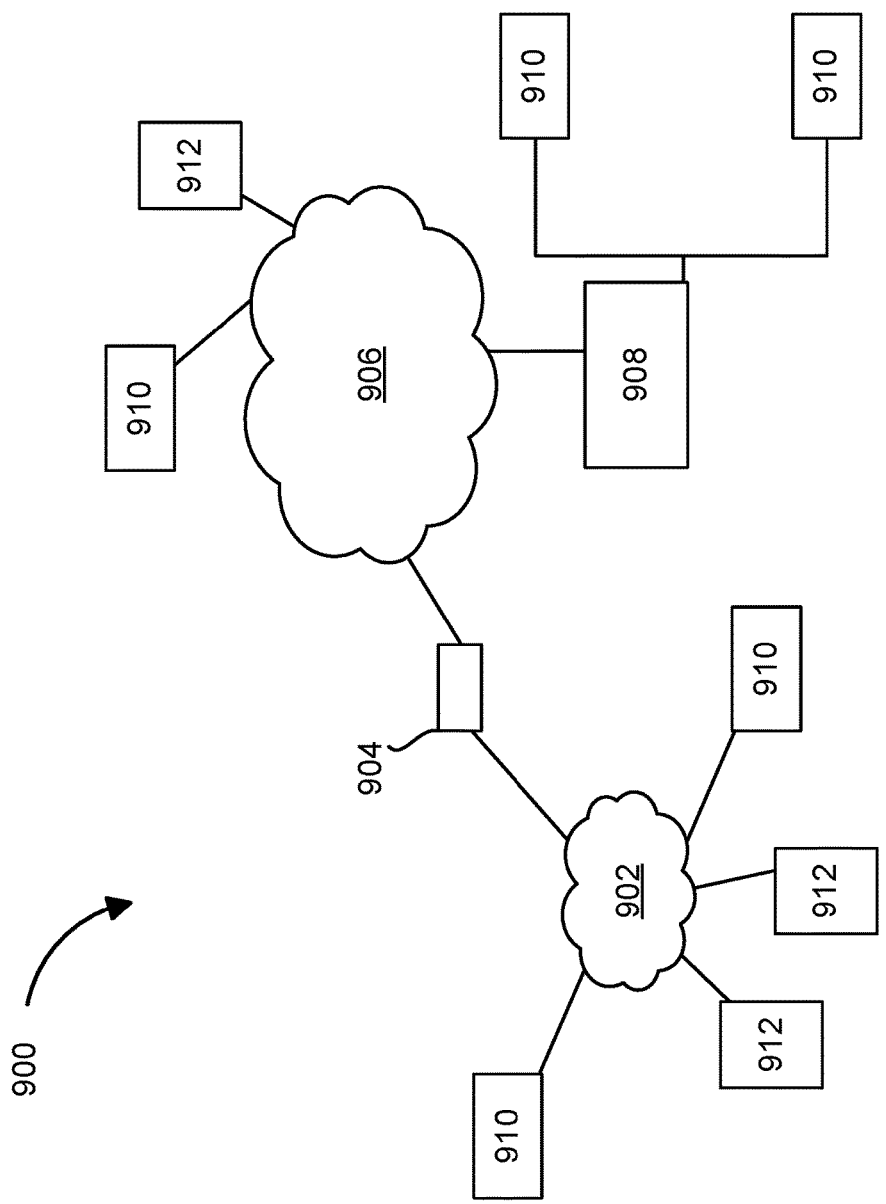
FIG. 9 illustrates a network architecture, according to one exemplary embodiment.

Referring now to FIG. 9, a network architecture 900 is shown according to one exemplary embodiment. As shown in FIG. 9, the network architecture 900 comprises at least one remote networks 902. A gateway 904 may be operatively coupled to the remote network 902 and a proximate network 906. The networks 902, 906 may comprise a LAN, a WAN such as the Internet, etc. The gateway 904 may function as a router capable of directing a given packet of data that arrives at the gateway 904, and/or a switch capable of providing the actual path in and out of the gateway 904 for a given packet.

The network architecture may also include at least one server 908 operatively coupled to the proximate network 906, and to the remote network 902 via the gateway 902. The server 908 is also coupled to one or more user devices 910, which may include but are not limited to a desktop computer, laptop computer, hand-held computer, printer, personal digital assistant (PDA), communications device, etc. One or more user devices 910 may also be directly coupled to networks 902, 906 in some embodiments. One or more peripheral devices 912 such as facsimile machines, printers, networked storage units, etc., may be coupled to one or more of the networks 902, 904.

Figure 10:
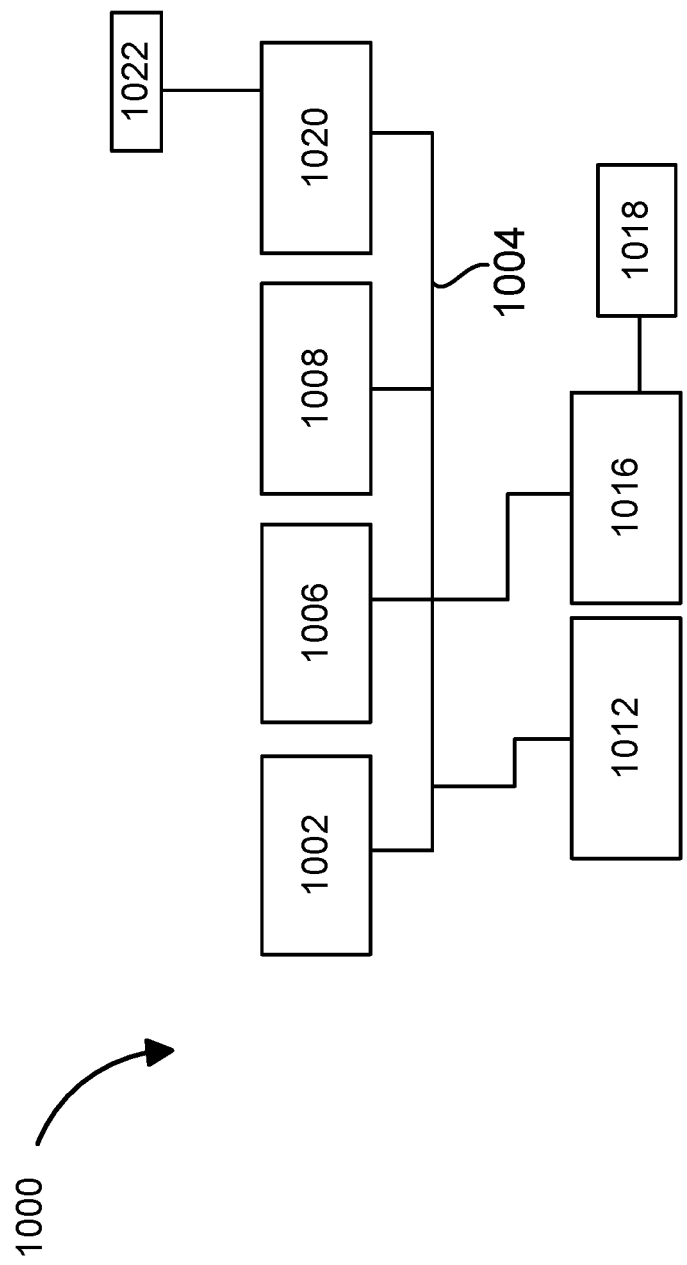
FIG. 10 illustrates a hardware environment/workstation, according to one embodiment.

Referring now to FIG. 10, an exemplary hardware architecture (workstation) 1000 associated with a server (e.g., 908 in FIG. 9) and/or a user device (e.g., 910 in FIG. 9) is shown according to one non-limiting embodiment. The workstation 1000 may comprise a central processing unit (CPU) 1002 (e.g., a processor) operatively coupled to other components via, e.g., a bus 1004. In some embodiment, the workstation 1000 may include one or more memory components 1006 such as a Random Access Memory (RAM) and a Read Only Memory (ROM). The workstation 1000 may also comprise an I/O adapter 1008 configured to connect the bus 1004 to one or more peripheral the devices (not shown) (e.g., storage units). The workstation 1000 may further include: a user interface adapter 1012 configured to connect the bus 1004 to one or more interface devices (not shown) (e.g., a keyboard, a mouse, a speaker, a microphone, a touch screen, digital camera, etc.): a display adapter 1016 configured to connect the bus 1004 to one or more display devices (e.g., a monitor 1018); a communication adapter 1020 configured to connect the workstation 1000 to a network 1022. The workstation 1000 may have thereon an operating system such as the Microsoft WINDOWS Operating System (OS), a MAC OS, a UNIX OS, etc.

It is of note that the flowcharts and block diagrams of the FIGS. presented herein may illustrate the architecture, functionality, and/or operations of possible implementations of the systems, methods and computer program products of the present invention. According, in some embodiments, the blocks in the flowcharts or block diagrams may represent a module, segment, etc. which may comprise computer executable program code (e.g., computer readable instructions) for implementing the specified functions. Moreover, one or more of the functions noted in the method flowchart may occur according to a different order than as specified in the FIGS, or concurrently.

EXAMPLES

As discussed herein, embodiments of the present invention are directed to novel systems, methods and computer program products facilitating quick and secure access to pertinent information described, e.g., in financial documents, insurance documents, trust documents, wills, medical records, real estate documents, etc. Such pertinent information may be particularly described in documents corresponding to an originator, e.g., an individual who controls or owns assets or property described in the documents or is otherwise referenced in said documents. Over time, the control or ownership of assets or property described in the originator documents, or the control over the person/health of the originator may need to be transferred to successors (e.g., authorized users or entities). However, such transition may be both time consuming and expensive, as obtaining information about said assets, property, and health of the originator from particular entities requires adherence to a multitude of different procedures instituted thereby, as well as the repeated presentation of the originator documents and identifying information of the successors.

Pertinent information associated with originator documents may be stored in a data management system comprising a database and a computing device (e.g., a server), along with identification information associated with successors. Accordingly, legal costs and other business operating costs associated with oversight of the transition process in which successors take over management, control and modification of originator documents may be drastically reduced or eliminated since the information described in the originator documents and identities of the succors are verified (and thus deemed to be true/accurate) when initially input into the data management system. The possibility of fraud may also be reduced or eliminated again because all the information associated with the originator documents and identifying information of the successors is verified at the time of initiation/uploading.

In some embodiments, one or more entities may pay a subscription fee to utilize the services provided by the data management system, such as secure and quick access to current information regarding an originator and his/her verified successors. To protect the personal information of the originator, the entities may only have access to particular information relevant to the services provided by said entities (e.g., city/county EMS dispatchers may only have access to medical records of the originator such as do-not-resuscitate instruction, end of life directive, list of allergies, etc.). Indeed, a bank would not need to view medical records of the originator (a possible HIPA violation), nor would a hospital need to know how much property the originator owns.

In some embodiments, the systems, methods and computer program produces disclosed herein may be tailored to the specific needs of each entity. For instance, law enforcement entities may require particular information and a particular format for a relevant originator documents than as required by a hospital or a bank. All information associated with originator documents from each entity will be stored in a specific section of the database of the data management system. Only authorized entities may be allowed access to the stored information. In some embodiment, entities may be configured to record/upload originator document information in different ways, such as by an account number associated with the user account of the originator at initiation/creation thereof, or by various personal ID's ("Unsubscribed method").

As one illustrative example, a bank may execute an application locally stored on a computing device of the bank, or a web browser application via utilization, at least in part, of a processor associated with said computing device. The application may provide a user interface with which the bank may interact to complete various activities/transactions. Information input in the application may be provided to a data management system for storage in a database thereof, wherein access to said data management system is by a paid subscription program. In some embodiments, the user interface may display one or more tabs.

In some embodiments, the above bank may only have access to the certain information stored in database. For instance, to verify the identity of successors acting on behalf of an originator, the bank may have access to: information associated with will(s) of the originator; information associated with trust(s) (living revocable or living trusts, trust fund accounts) of the originator; and information associated with durable power of attorney (DPOA) documents.

In some embodiments, the above bank may input/upload information to the data management system to keep the estate of the originator current for the purposes of the bank and for the successor, where said information is associated with the account number of the originators user's account. In a particular embodiment, said information may be input by the bank into a designate area (e.g., a specific tab) of the user interface of the application executing on a computing device of the bank, and ultimately transferred to the data management system for storage in the database thereof. As said information is associated with the account number of the originator's user account, said information may become part of the originator's user account (e.g., said information is accessible from the originator's user account). In another tab provided in the user interface, the bank may update information associated with all individuals, not just the originator.

The following illustrative examples highlight the layers of security to protect person information stored in the database of the data management system. The embodiments of the invention described herein enable originators and successors to be able to manage pertinent information in originator documents even where the originator and successors live in different areas (different cities, different states, etc.), thus eliminating the need for travel.

Layers of Security:

A user (e.g., an originator) may interact with a user interface to input a subscription fee for access to the data management system. An account number may then be issued to the originator. Once the account number issues, the originator may also interact with the same or a modified user interface to input identifying information (e.g., as defined in categories 1, 2 and 3 listed in Example 1, infra). In some embodiments, once the account number is issued and/or once the originator identifying information is input, the originator may be automatically logged out of the user session, and must login/sign in using the account number to access the associated account.

The originator may next interact with a user interface to input ID information associated with successors specified in originator documents. In response to the originator confirming the completion of entry of successor ID information, the originator may be automatically logged out of the user session, and must log/sign using the account number to access the associated account.

The originator may then be required to input the account number, originator ID information (from category 1, 3, and/or 3 as described in Example 1), and one or more login credentials (e.g., a PIN, password, etc.) to log back into the associated account. Upon such login, the originator may have full access to all options provided by the data management system and may upload all originator documents.

In some embodiments where the account is tampered with, e.g., if the number of login attempts thereto exceeds a predetermined threshold (e.g., 3 login attempts), or is otherwise improperly accessed or modified, the originator may be notified e.g., by email, mail, a SMS message, etc. and provided with instructions on how to proceed.

In some embodiments, all participating entities may require verification of ID information anytime the originator wants to make a change to the account. Each change to the account (e.g., each transaction, which may include modifying originator documents already stored in the database, the creation of new originator documents, etc.) at the participating entities may be associated with the account number of the originator's user account, thereby ensuring that information pertaining to the affairs and estate of the originator provided in the user account is kept current.

Example 1

All documentation may be provided and verified by a third party (e.g., a lawyer) through each stage.

Initiation

All of the originator's documents (e.g., trusts, DPOA, health directive, do-not-resuscitate instructions, real estate owned, bank accounts, insurance policies, etc.) are uploaded along with identification (ID) information associated with the originator. The ID information may be classified as follows:
- ID Category 1: Physical, textual identity document—driver's license/state issued ID, birth certificate, naturalization papers, social security care, passport, etc.
- ID category 2: biometric characteristics—all ten fingerprint impressions, facial recognition scan, retinal scan, voice pattern, and signature scan.
- ID Category 3: Knowledge-based ID—8 security questions to which the user provides answers.

The account number is provided to the originator. This ensures that each transaction (e.g., modification of information associated with the account number) is recorded in the proper account. Each transaction is verified by ID information (from categories 1, 2, and/or 3) of the originator and matched with the user account number.

Successors are named and their ID information (from categories 1, 2, and/or 3) may be verified by the third party (lawyer) and originator, confirmed and uploaded into the database of the data management system.

When the originator may work on his/her own behalf, the account status of the originator's account is "RED." Only the originator may make any changes to documents/accounts in the database when the user account is assigned "RED" status.

In some embodiments, there needs to be two verifications of originator ID information from at least one, at least two, or each ID category at every transaction. For instance, in some embodiments, each transaction (e.g., each modification of existing information associated with the user account, and/or addition of new information thereto) may require verification of at least two physical, textual identity documents, such as the originator's driver's license and social security card. In another embodiment, each transaction may require verification of at least two biometric characteristics, such as two fingerprint impressions, or a one fingerprint impression and a facial scan, etc. In yet another embodiment, each transaction may require verification of at least two knowledge based identification, such as provision of at least two answers to predetermined security questions. In still another embodiment, each transaction may require verification of at least two physical, textual identity documents, at least two biometric characteristics, and at least two knowledge based identifications.

Transition

Once an originator does not want to handle his/her own affairs or is unable to do so (e.g., by reason of death, legal incapacity, etc.), authorized successors may go to a third party (e.g., a lawyer) and provide specified documentation to enable the successors to work on behalf of the originator. This information may include a letter from the originator, a doctors' note, or anything else that is specified in the originator documents set up during the initiation period that signals a transition of responsibility to the successors.

Once all the information, documents and ID information of the successors is verified and confirmed, the status of the originator's account changes to "GREEN," thereby allowing the successors to work on behalf of originators in the stated capacity. If the account number wasn't previously given to the successors by, e.g., the originator, said account number may be given to the successors at the time of transition.

As the identities of the successors were verified and uploaded at initiation, successors may only need to provide two verifications of successor ID information from at least one, at least two, or each ID category to complete transactions on behalf of the originator, according to some embodiments.

If the status of the account changes to "YELLOW," the successor may need to provide additional ID information prior to accessing the originator's user account and/or the information associated therewith.

Example 2

In one embodiment, the originator fills out forms provided by the data management system and which are related to particular originator documents (wills, living trust (revocable or irrevocable), complete list of assets, appointed successors, DPOA, health representatives, and all of their ID information (from categories 1, 2, and/or 3 reference in Example 1). The online forms may be customized to the operating system format of the data management system. The originator may perform the same transaction as in Example 1, with the difference that a third party (e.g., a lawyer) is not required to verify the ID information associated with the originator and successors. In some embodiments, a third party verification company (e.g., Live Scan or analogues thereof) may be used to verify the ID information of the originators and successors as defined in category 2 of Example 1.

Initiation

The originator pays a fee to subscribe to the data management system and is issued an account number. Provision of the account number may allow the originator to fill out forms available online via the data management system.

Once forms are filled out, said forms may be uploaded into the database of the data management system, along with ID information of the originator and successors.

Transition

Proceeds according to the transition as described in Example 1.

Example 3

In one embodiment, the database of the data management system may be utilized for cost effective storage of one or more documents. In one such embodiment, the originator pays a reduced fee to subscribe to the data management system and the database of the data management system may act as a secure storage facility for important documents. In some embodiments, the originator is tasked with keeping user data stored in the database updated and current.

Initiation

As indicated above, the originator pays a fee to subscribe to the data management system and an account number is issued to the originator. The originator may interact with a user interface to fill out information needed for proper storage of the originator's documents.

The originator may then upload all ID information (e.g., from categories 1, 2, and/or 3 as defined in Example 1) associated with the originator and successors.

The originator may next upload all documents (such as originator documents as described herein) to be stored in the database of the data management system.

Transition

There may be no transition associated with the embodiment of Example 3, as Example 3 describes a "storage only" embodiment.

Example 4

As indicated previously, authorized entities (e.g., a bank, hospital, insurance companies, etc.) may execute an application locally stored on a computing device of the respective entity, or a web browser application via utilization, at least in part, of a processor associated with said computing device. The application may provide a user interface with which the entity may interact to complete various activities/transactions. Information input in the application may be provided to a data management system for storage in a database thereof, wherein access to said data management system is by a paid subscription program. In some embodiments, the user interface of the application may display one or more tabs. One such tab may be labeled as "Unsubscribed." Entities may provide, in the "Unsubscribed" tab, information associated with individuals who have not subscribed to the data management system. For each such individual, said information may become a "user profile" of the individual.

Moreover, in additional embodiments, all government agencies may be listed as authorized entities. In further embodiments, the government agencies may have access to all information in the aforementioned user profile of an individual. However, all other entities may only have access to pertinent user information.

The embodiment(s) of Example 4 are directed to the creation and maintenance of user profiles of individuals performing common practices (banking, hospital visits, real estate ventures, etc.) According, the embodiment(s) of Example 4 may be beneficial to: IRS, Federal and local government agencies, law enforcement, social security, court system, credit card companies, insurance companies, hospitals, EMS companies, banks, title companies, credit reporting agencies, employers, pension departments, companies with long term, multi-generational lease agreements, etc.

Information associated with individuals may be uploaded into the data management system via two illustrative methods. For instance, an individual may voluntarily upload all pertinent information to keep their estate health records, and other affairs current.

Information associated with the individual may also be uploaded via the "unsubscribed" tab in instances where the individual has no need or desire to subscribe to the data management system. Given that the individual doesn't have an account number issued by data management system, the individual always provides ID information (e.g., a driver's license, social security number, fingerprint scan, etc.) to the bank, hospital, title company, employer, etc., in order to complete a transaction. Every time an individual executes a transaction (banking, escrow, hospital, etc.), a record thereof or pertinent information associated therewith is uploaded to and stored in the database of the data management system according to the category "Unsubscribed." This feature may be particularly helpful to law enforcement entities and the court system. For example, a law enforcement entity may simply need to enter a driver's license number, a social security number, and fingerprint scan(s) of an individual, and all assets (bank accounts, real estate, pensions, insurance policies, etc.), children (under 18), employment information associated with individual is provided by virtue to the data management system.

It is of note that in various embodiments described herein, different information may be associated with different tabs and stored accordingly in the database of the data management system. In some embodiments, the number of tabs may be expanded, e.g., by an authorized user or entity.

In some embodiments, entities may have access to information in tabs that is not associated with its primary functions/services. For example, a hospital may have access to a "Law Enforcement Information" tab. Consider an instance in which an individual suffering from a gunshot wound goes to the emergency room for treatment. Given the hospital's access to law enforcement information, a hospital may discover that the wounded individual has a warrant for his/her arrest and may thus call the appropriate authorities. Apprehension of the wanted individual is more efficient, as the hospital does not need wait to hear that said individual is wanted via public bulletins, news outlets or the police. Rather, the hospital would become aware of the wanted status of the individual upon entering ID information associated with the wanted individual, such as any one of: a fingerprint, a retinal scan, facial scan, voice pattern, social security number, driver's license, etc. The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. A method implemented by a computing system including one or more hardware processors and non-transitory storage media storing machine-readable instructions, wherein the method is performed using the one or more hardware processors, the method comprising:
    creating a user account for an originating user;
    receiving identification information associated with the originating user through a first graphical user interface (GUI);
    presenting a second GUI to draft an electronic form of a legal document, the second GUI including a first GUI region to fill one or more persons relevant to the legal document form and a second GUI region to fill one or more triggering legal conditions to cause a legal effect on the legal document, wherein the one or more triggering legal conditions comprise at least one of: death of the originating user, legal incapacity of the originating user, and a record of the originating user's consent to change the status of the user account;
    associating the one or more persons with the legal document as one or more potentially-authorized users and receiving identification information associated with each of the one or more potentially-authorized users through a third GUI;
    storing the identification information associated with the originating user, the legal document associated with the originating user, and the identification information associated with each of the one or more potentially-authorized users;
    assigning the user account a first status, wherein the one or more potentially-authorized users are not granted access to the legal document when the user account is assigned the first status regardless of any credentials provided by the or more potentially-authorized users;
    determining whether the one or more triggering legal conditions are met, while the user account is assigned the first status;
    upon determining the one or more triggering legal conditions to cause the legal effect are met, changing a status of the user account from the first status to a second status that grants the one or more potentially-authorized users access to the legal document.

2. The method of claim 1, wherein the identification information associated with the originating user comprises at least one of: a driver's license, a birth certificate, a social security card, a state issued identification document, and a passport.

3. The method of claim 1, wherein the identification information associated with each of the one or more potentially-authorized users comprises at least one of: a driver's license, a birth certificate, a social security card, a state issued identification document, and a passport.

4. The method of claim 1, wherein the legal document associated with the originating user is selected from the group consisting of: one or more wills, one or more trusts, one or more financial statements, one or more medical records, one or more insurance policies, one or more real-estate documents, and combinations thereof.

5. The method of claim 1, wherein the identification information associated with the originating user, the legal document associated with the originating user, and the identification information associated with each of the one or more potentially-authorized users are stored in a database.

6. The method of claim 1, further comprising receiving a request, by the originating user, to modify the legal document associated with the originating user.

7. The method of claim 6, further comprising granting the request in response to verifying the identity of the originating user.

8. The method of claim 1, wherein the one or more triggering legal conditions comprise at least one of: death of the originating user, legal incapacity of the originating user, and a record of the originating user's consent to change the status of the user account.

9. The method of claim 1, further comprising receiving a request, by one of the one or more potentially-authorized users, to access and/or modify the legal document with which the one of the potentially-authorized users is associated, and granting the request in response to verifying the identity of the one of the one or more potentially-authorized users.

10. The method of claim 1, further comprising changing the status of the user account from the second status to a third status in response to a second triggering legal condition.

11. The method of claim 10, wherein the third status of the user account prevents each potentially-authorized user from accessing the user account until the identity of each potentially-authorized user is verified.

12. The method of claim 11, further comprising receiving a request, by one of the one or more potentially-authorized users, to access and/or modify the legal document with which the one of the one or more potentially-authorized users is associated.

13. The method of claim 12, further comprising changing the status of the user account from the third status to the second status in response to verifying the identity of the one of the one or more potentially-authorized users, and granting the request.

* * * * *